US012544357B2

(12) United States Patent
Kurtis et al.

(10) Patent No.: US 12,544,357 B2
(45) Date of Patent: Feb. 10, 2026

(54) **COMPOSITIONS AND METHODS FOR THE TREATMENT OF *PLASMODIUM FALCIPARUM* MALARIA**

(71) Applicants: Brown University, Providence, RI (US); Florida Atlantic University Board of Trustees, Boca Raton, FL (US)

(72) Inventors: Jonathan Kurtis, Providence, RI (US); Andrew V. Oleinikov, Boca Raton, FL (US); Dipak K. Raj, Lincoln, RI (US)

(73) Assignees: BROWN UNIVERSITY, Providence, RI (US); FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 0 days.

(21) Appl. No.: 18/279,031

(22) PCT Filed: Feb. 28, 2022

(86) PCT No.: PCT/US2022/018169
§ 371 (c)(1),
(2) Date: Aug. 25, 2023

(87) PCT Pub. No.: WO2022/183111
PCT Pub. Date: Sep. 1, 2022

(65) Prior Publication Data
US 2024/0156776 A1  May 16, 2024

Related U.S. Application Data

(60) Provisional application No. 63/154,105, filed on Feb. 26, 2021.

(51) Int. Cl.
| | | |
|---|---|---|
| *A61K 31/357* | (2006.01) | |
| *A61K 31/4025* | (2006.01) | |
| *A61K 31/453* | (2006.01) | |
| *A61K 31/496* | (2006.01) | |
| *A61K 31/5377* | (2006.01) | |
| *A61K 31/55* | (2006.01) | |
| *A61P 33/06* | (2006.01) | |

(52) U.S. Cl.
CPC ........ *A61K 31/357* (2013.01); *A61K 31/4025* (2013.01); *A61K 31/453* (2013.01); *A61K 31/496* (2013.01); *A61K 31/5377* (2013.01); *A61K 31/55* (2013.01); *A61P 33/06* (2018.01)

(58) Field of Classification Search
None
See application file for complete search history.

(56) References Cited

FOREIGN PATENT DOCUMENTS

| IN | 201821008057 | 9/2019 |
|---|---|---|
| IN | 201821008057 A | 9/2019 |
| WO | 2009131384 A2 | 10/2009 |
| WO | 2011061277 A1 | 5/2011 |

OTHER PUBLICATIONS

Boggs et al. Parasite antigen shows promise as malaria vaccine. Reuters. Retrieved from the Internet on Apr. 2, 2024. Published Apr. 27, 2020. (Year: 2020).*
"International Search Report and Written Opinion received for PCT Patent Application No. PCT/US2022/018169, mailed on Jun. 15, 2022", 11 pages.
Pubchem , "SID 292621327", Retrieved from the Internet <URL: https://pubchem.ncbi.nlm.nih.gov/substance/292621327> entire document, Jan. 20, 2016, 5 pages.
Tcherniuk , et al., "Anti-Malarial Effect of Semi-Synthetic Drug Amitozyn", Malaria Journal, vol. 14, No. 425, 2015, pp. 1-10.
Tcherniuk , "Nicotinamide Inhibits the Growth of p. Falciparum and Enhances the Antimalarial Effect of Artemisinin, Chloroquine and Pyrimethamine", Molecular and Biochemical Parasitology, vol. 216, 2017, 31 pages.
Thackaberry , et al., "Solvent-Based Formulations for Intravenous Mouse Pharmacokinetic Studies: Tolerability and Recommended Solvent Dose Limits", Xenobiotica, vol. 44, No. 3, Oct. 18, 2013, pp. 235-241.
Wang , et al., "Ligand-Free Cui-Catalyzed Selective C—N Coupling of Aliphatic Amino Group of a-Amino Acid Amides with Ortho-Dihaloarenes", Tetrahedron Letters, vol. 54, No. 45, 2013, pp. 6045-6048.
Wen , et al., "Identification of a Novel Bcl-2 Inhibitor by Ligand-Based Screening and Investigation of Its Anti-cancer Effect on Human Breast Cancer Cells", Frontiers in Pharmacology, vol. 10, Article 391, Apr. 2019, 14 pages.
Woodrow, et al., "The Clinical Impact of Artemisinin Resistance in Southeast Asia and the Potential for Future Spread", FEMS Microbiology Reviews, vol. 41, Issue 1, Sep. 8, 2016, pp. 34-48.
Zhang , et al., "Uncovering the Essential Genes of the Human Malaria Parasite Plasmodium Falciparum by Saturation Mutagenesis", Science, vol. 360, No. 506, May 4, 2018, pp. 1-12.
Zhou , et al., "A Useful Pd-Catalyzed Negishi Coupling Approach to Benzylic Sulfonamide Derivatives", Organic Letters, vol. 10, No. 12, 2008, pp. 2517-2520.
Zhu , et al., "Deconvolution of Multiple Infections in Plasmodium falciparum from High Throughput Sequencing Data", Bioinformatics, vol. 34, 2018, pp. 9-15.
"The World Malaria Report 2020: 20 Years Of Global Progress and Challenges", World Health Organization, Nov. 30, 2020, 19 pages.
"World Malaria Report 2016", World Health Organization, Dec. 12, 2016, 186 pages.
"World malaria situation in 1994. Part I. Population at risk", The Weekly Epidemiological Record, vol. 72, No. 36, 1997, pp. 269-274.

(Continued)

*Primary Examiner* — James H Alstrum-Acevedo
*Assistant Examiner* — Lauren Wells
(74) *Attorney, Agent, or Firm* — K&L Gates LLP

(57) ABSTRACT

Described herein are compositions and methods for treating *P. falciparum* malaria by specifically activating apoptosis in cells that express PfGARP without activating apoptosis in subject host cells or parasite cells that do not express PfGARP.

3 Claims, 14 Drawing Sheets

Specification includes a Sequence Listing.

(56) References Cited

OTHER PUBLICATIONS

Angulo-Barturen, et al., "A Murine Model of falciparum-Malaria by In Vivo Selection of Competent Strains in Non-Myelodepleted Mice Engrafted with Human Erythrocytes", PLos ONE, vol. 3, Issue 5, May 2008, pp. 1-14.

Banfor, et al., "A novel Intravenous Vehicle for Preclinical Cardiovascular Screening of Small Molecule Drug Candidates in Rat", Journal of Pharmacological and Toxicological Methods, vol. 82, 2016, pp. 62-67.

Barber, et al., "Structure-Guided Design of a Synthetic Mimic of an Endothelial Protein C Receptor-Binding PfEMP1 Protein", mSphere, vol. 6, Issue 1, e01081-20, 2021, pp. 1-14.

Beier, et al., "Plasmodium falciparum Incidence Relative to Entomologic Inoculation Rates at a Site Proposed for Testing Malaria Vaccines in Western Kenya", The American Journal of Tropical Medicine and Hygiene, vol. 50: Issue 5, May 1994, pp. 529-536.

Breman, et al., "The Intolerable Burden of Malaria: A New Look at the Numbers", The American Journal of Tropical Medicine and Hygiene, vol. 64 (1-2 Suppl). iv-vii, 2001, 5 pages.

Ch'ng, et al., "Drug-Induced Permeabilization of Parasite's Digestive Vacuole is a Key Trigger of Programmed Cell Death in Plasmodium falciparum", Cell Death and Disease, vol. 2, No. 10, e216, Oct. 13, 2011, 11 pages.

Cheruiyot, et al., "Assessment of the Worldwide Antimalarial Resistance Network Standardized Procedure for In Vitro Malaria Drug Sensitivity Testing Using SYBR Green Assay for Field Samples with Various Initial Parasitemia Levels", Antimicrobial Agents and Chemotherapy, vol. 60, Issue 4, Apr. 2016, pp. 2417-2424.

Daina, et al., "SwissADME: A Free Web Tool to Evaluate Pharmacokinetics, Drug-Likeness and Medicinal Chemistry Friendliness of Small Molecules", Scientific Reports, vol. 7, No. 1, Article 42717, Mar. 3, 2017, 13 pages.

Deplaine, et al., "The Sensing of Poorly Deformable Red Blood Cells by the Human Spleen can be Mimicked in Vitro", Blood, vol. 117, No. 8, Feb. 24, 2011, pp. e88-e95.

Dongen, et al., "A Small-Molecule Fusion Inhibitor of Influenza Virus is Orally Active in Mice", Science, vol. 363, No. 1056, Mar. 8, 2019, pp. 1-12.

Du, et al., "Kinetics of Sickle Cell Biorheology and Implications Forpainful Vasoocclusive Crisis", Proceedings of the National Academy of Sciences, vol. 112, No. 5, Feb. 3, 2015, pp. 1422-1427.

Duffey, et al., "Assessing Risks of Plasmodium falciparum Resistance to Select Next-Generation Antimalarials", Trends in Parasitology, vol. 37, No. 8, Aug. 2021, pp. 709-721.

Favuzza, et al., "Dual Plasmepsin-Targeting Antimalarial Agents Disrupt Multiple Stages of the Malaria Parasite Life Cycle", Cell Host & Microbe, vol. 27, Apr. 8, 2020, pp. 642-658e12.

Gillrie, et al., "Thrombin Cleavage of Plasmodium falciparum Erythrocyte Membrane Protein 1 Inhibits Cytoadherence", mBio, vol. 7, Issue 5, e01120-16, 2016, pp. 1-16.

Gullingsrud, et al., "High-Throughput Screening Platform Identifies Small Molecules That Prevent Sequestration of Plasmodium falciparum-Infected Erythrocytes", The Journal of Infectious Diseases, vol. 211, No. 7, Apr. 1, 2015, pp. 1134-1143.

Hajduk, Philip J., "SAR by NMR: Putting the Pieces Together", Molecular Interventions, vol. 6, No. 5, Oct. 1, 2006, pp. 266-272.

Houghten, Richard A., "General Method for the Rapid Solid-Phase Synthesis of Large Numbers of Peptides: Specificity of Antigen-Antibody Interaction at the Level of Individual Amino Acids", Proceedings of the National Academy of Sciences, vol. 82, No. 15, Aug. 1985, pp. 5131-5135.

Hovlid, et al., "Phenotypic Screens in Antimalarial Drug Discovery", Trends in Parasitology, vol. 32, Issue 9, 2016, pp. 697-707.

Ikeda, et al., "Artemisinin-Resistant Plasmodium falciparum with High Survival Rates, Uganda, 2014-2016", Emerging Infectious Diseases, vol. 24, No. 4, Apr. 2018, pp. 718-726.

JiméNez-díaz, et al., "Improved Murine Model of Malaria Using Plasmodium falciparum Competent Strains and Non-Myelodepleted NOD-scid IL2Rγnull Mice Engrafted with Human Erythrocytes", Antimicrobial Agents and Chemotherapy, vol. 53, Issue 10, Oct. 2009, pp. 4533-4536.

Kelner, et al., "The mRNA Cap Methyltransferase Gene TbCMT1 is Not Essential in Vitro but is a Virulence Factor in Vivo for Bloodstream form Trypanosoma brucei", PLos ONE, vol. 13, Issue 7, Jul. 24, 2018, pp. 1-14.

Kim, et al., "Structure and Drug Resistance of the Plasmodium falciparum Transporter PfCRT", Nature, vol. 576, Article 7786, Nov. 27, 2019, 33 pages.

Kurtis, et al., "Human Resistance to Plasmodium falciparum Increases during Puberty and is Predicted by Dehydroepiandrosterone Sulfate Levels", Infection and Immunity, vol. 69, No. 1, Jan. 2001, pp. 123-128.

Kurtis, et al., "Interleukin-10 Responses to Liver-Stage Antigen 1 Predict Human Resistance to Plasmodium falciparum", Infection and Immunity, vol. 67, No. 7, Jul. 1999, pp. 3424-3429.

Li, Philip J., "A Practical Perspective on the Roles of Solution NMR Spectroscopy in Drug Discovery", Molecules, vol. 25, Article 2974, 2020, pp. 1-19.

Lipinski, Christopher A., "Lead- and Drug-Like Compounds: The Rule-of-Five Revolution", Drug Discovery Today: Technologies, vol. 1, No. 4, 2004, pp. 337-341.

Llanos-Cuentas, et al., "Antimalarial Activity of Single-Dose DSM265, a Novel Plasmodium Dihydroorotate Dehydrogenase Inhibitor, in Patients with Uncomplicated Plasmodium Falciparum or Plasmodium Vivax Malaria Infection: A Proof-of-Concept, Open-Label, Phase 2a Study", The Lancet Infectious Diseases, vol. 18, No. 8, Jun. 13, 2018, pp. 874-883.

Maier, et al., "Exported Proteins Required for Virulence and Rigidity of Plasmodium falciparum-Infected Human Erythrocytes", Cell, vol. 134, No. 1, Jul. 11, 2008., pp. 48-61.

Nefzi, et al., "Combinatorial Chemistry: Libraries from Libraries, the Art of the Diversity-Oriented Transformation of resin-Bound Peptides and Chiral Polyamides to Low Molecular Weight Acyclic and Heterocyclic Compounds", The Journal of Organic Chemistry, vol. 69, No. 11, May 28, 2004, pp. 3603-3609.

Nema, et al., "Excipients and their Role in Approved Injectable Products: Current Usage and Future Directions", PDA Journal of Pharmaceutical Science and Technology, vol. 65, No. 3, 2011, pp. 287-332.

Nixon, et al., "Antibodies to Rhoptry-Associated Membrane Antigen Predict Resistance to Plasmodium falciparum", The Journal of Infectious Diseases, vol. 192, Sep. 1, 2005, pp. 861-869.

Ocholla, et al., "Whole-genome Scans Provide Evidence of Adaptive Evolution in Malawian Plasmodium falciparum Isolates", The Journal of Infectious Diseases, vol. 210, Dec. 15, 2014, pp. 1991-2000.

Ockenhouse, et al., "Induction of Crisis Forms in the Human Malaria Parasite Plasmodium falciparum by Gamma-Interferon-Activated, Monocyte-derived Macrophages", The Journal of Immunology, vol. 133, No. 3, Sep. 1984, pp. 1601-1608.

Oleinikov, et al., "A Plasma Survey Using 38 PfEMP1 Domains Reveals Frequent Recognition of the Plasmodium falciparum Antigen VAR2CSA among Young Tanzanian Children", Plos One, vol. 7, No. 1, Jan. 2012, 8 pages.

Oleinikov, et al., "Effects of Sex, Parity, and Sequence Variation on Seroreactivity to Candidate Pregnancy Malaria Vaccine Antigens", The Journal of Infectious Diseases, vol. 196, Jul. 1, 2007, pp. 155-164.

Oleinikov, et al., "High Throughput Functional Assays of the Variant Antigen PfEMP1 Reveal a Single Domain in the 3D7 Plasmodium falciparum Genome that Binds ICAM1 with High Affinity and is Targeted by Naturally Acquired Neutralizing Antibodies", Plos Pathogens, vol. 5, No. 4, Apr. 2009, 10 pages.

Pandey, et al., "Assessment of Toxicity and Tolerability of a Combination Vehicle; 5% Pharmasolve, 45% Propylene Glycol and 50% Polyethylene Glycol 400 in Rats Following Repeated Intravenous Administration", Regulatory Toxicology and Pharmacology, vol. 91, 2017, pp. 103-108.

(56) References Cited

OTHER PUBLICATIONS

Phillips, et al., "A Long-Duration Dihydroorotate Dehydrogenase Inhibitor (DSM265) for Prevention and Treatment of Malaria", Science Translational Medicine, vol. 7, Issue 296, 296ra111-296ra111., Jul. 15, 2015, pp. 1-12.

Pramanick, et al., "Excipient Selection in Parenteral Formulation Development", Pharma Times, vol. 45, No. 3, Mar. 2013, pp. 65-77.

Raj, et al., "Antibodies to PfSEA-1 Block Parasite Egress from RBCs and Protect Against Malaria Infection", Science, vol. 344, No. 6186, May 23, 2014, pp. 871-877.

Raj, et al., "Anti-PfGARP Activates Programmed Cell Death of Parasites and Reduces Severe Malaria", Nature, vol. 582, No. 7810, Apr. 22, 2020, pp. 1-27.

Setua, et al., "Disrupting Plasmodium UIS3-host LC3 Interaction with a Small Molecule Causes Parasite Elimination from Host Cells", Communications Biology, vol. 3, No. 1, Article 688, 2020, pp. 1-10.

Shi, et al., "Applications of Solution NMR in Drug Discovery", Molecules, vol. 26, No. 3, Article 576, Jan. 22, 2021, pp. 1-21.

Skurnik, et al., "A Comprehensive Analysis of In Vitro and In Vivo Genetic Fitness of Pseudomonas aeruginosa Using High-Throughput Sequencing of Transposon Libraries", PLOS Pathogens, vol. 9. Issue 9, e1003582, Sep. 2013, pp. 1-16.

Smilkstein, et al., "Simple and Inexpensive Fluorescence-Based Technique for High-Throughput Antimalarial Drug Screening", American Society for Microbiology, vol. 48, Issue 5, May 2004, pp. 1803-1806.

Somsak, et al., "Flow Cytometric Enumeration of Plasmodium berghei-Infected Red Blood Cells Stained with SYBR Green I", Acta Tropica, vol. 122, No. 1, 2012, pp. 113-118.

Talundzic, et al., "Sequence Polymorphism, Segmental Recombination and Toggling Amino Acid Residues within the DBL3X Domain of the VAR2CSA Placental Malaria Antigen", PLoS One, vol. 7, Issue 2, e31565, Feb. 2012, pp. 1-11.

"Extended European Search Report received for EP Patent Application No. 22760572.2, mailed on Nov. 28, 2024", 12 pages.

Degliesposti, et al., "Design and Discovery of Plasmepsin II Inhibitors Using an Automated Workflow on Large-Scale Grids", Chem Med Chem, vol. 4, No. 7, 2009, pp. 1164-1173.

Li, et al., "Confirmation of Predicted Activity for Factor Xla Inhibitors from a Virtual Screening Approach", AIChE Journal, vol. 60, No. 8, Aug. 2014, pp. 2741-2746.

Theisen, et al., "Identification of a Major B-cell Epitope of the Plasmodium Falciparum Glutamate-rich Protein (GLURP), Targeted by Human Antibodies Mediating Parasite Killing", Vaccine, vol. 19, 2001, pp. 204-212.

\* cited by examiner

COMPOSITIONS AND METHODS FOR THE TREATMENT OF *PLASMODIUM FALCIPARUM* MALARIA

CROSS REFERENCE TO RELATED APPLICATIONS

This application is a national phase filing under 35 U.S.C. § 371 of international Application No. PCT/US2022/018169, filed Feb. 28, 2022, which claims priority to U.S. provisional patent application No. 63/154,105, filed Feb. 26, 2021, the entire contents of which are incorporated herein by reference.

BRIEF DESCRIPTION OF THE SEQUENCE LISTING

This submission is accompanied by a "Sequence Listing XML" containing SEQ ID NO: 1 and created on Apr. 30, 2025, 3 KB, submitted with the filename: "405505-683N01US.xml". SEQ ID NO: 1 (VKNVIEDEDKDGVEIIN) does not contain less than 4 non-"X" amino acid residues and is thus not mandatorily marked as an intentionally skipped sequence under WIPO Sequence software version 2.3.0. The Sequence Listing XML was generated using WIPO Sequence software version 2.3.0, in accordance with 37 CFR §§ 1.831 through 1.835, and is herewith submitted as an XML file, via the USPTO patent electronic filing system, 37 CFR § 1.835(a)(1). The Sequence Listing XML (i.e., "405505-683N01US.xml") is hereby incorporated by reference herein in its entirety.

FIELD OF THE INVENTION

The embodiments of the present invention relate to generally to the field of malaria therapeutics.

BACKGROUND OF THE INVENTION

*Plasmodium falciparum* malaria is a leading cause of morbidity and mortality in developing countries, infecting hundreds of millions of individuals and killing over 300,000 children each year.[1]

Currently, there are parasite strains that are resistant to all known anti-malarial drugs. For example, artemisinin and derivatives such as artesunate, are rapidly acting, well-tolerated endoperoxide compounds widely used in uncomplicated and severe *P. falciparum* malaria in south-east Asian countries and other parts of the world.[2,3,4] Indeed, artesunate is considered to be the best drug available for the treatment of severe and complicated malaria,[5] Although ACT (artemisinin-based combination therapy) has made a significant contribution to malaria control and to reducing disease transmission through reducing gametocyte carriage, there are several issues with this therapy. For example, administering ACT to infants and small children can be difficult and time consuming.[6] Specially formulating antimalarial therapeutics for this vulnerable population is vital to ease administration and help ensure that an accurate dose is received. Importantly, the spread of parasites resistant to the artemisinin family of compounds[7] threatens recent progress achieved by antimalarial campaigns and underscores the urgent need to identify new anti-malarial drugs.

Given the global impact of malaria, the anti-malarial drug discovery pipeline is alarmingly limited and strategies to identify novel drugs remain empiric—often relying on parasite growth assays at the stage of screening. Challenges with this traditional, phenotypic screening approach include host cell toxicity of the identified compounds (RBCs are unaffected by many anti-metabolites and thus do not flag toxicity during the screening phase), as well as challenges in scalability to truly high throughput screening approaches.

Accordingly, there remains a need in the art for new anti-malarial drugs and novel approaches to identify them.

BRIEF SUMMARY OF THE INVENTION

In recent work,[8,9] *P. falciparum* glutamic-acid-rich protein (PfGARP) was discovered as a parasite antigen that is recognized by antibodies in the plasma of children who are relatively resistant—but not those who are susceptible—to malaria caused by *P. falciparum*. Antibodies to the highly invariant carboxyl terminal of PfGARP inhibited parasite growth in vitro by 99% compared to controls by killing trophozoite stage parasites, effectively triggering a "kill switch" in malarial cells, causing them to self-destruct. In confocal and transmission electron microscopy studies, PfGARP localized to the exofacial surface of the red blood cell (RBC) membrane in trophozoite and early schizont infected RBCs, but not to other parasite stages or uninfected RBCs. Importantly, the growth inhibition assays were performed in the absence of any immune effector molecules (complement) or cells, thus establishing that the remarkable anti-parasite effect of anti-PfGARP resulted from antibody binding alone. This was further supported by the killing effect of a recombinant monoclonal antibody (mAb) and its recombinant monovalent Fab that target amino acid residues 443-459 (VKNVIEDEDKDGVEIIN; SEQ ID NO:1) of PfGARP.[10]

The present invention was based on the premise that PfGARP represented a high value druggable target given: (1) the PfGARP surface expression on infected RBCs, (2) the absence of any significant amino acid homology with human host proteins, and (3) the ability of antibody binding to PfGARP to kill essentially all parasites within 12-24 hours. To develop a drug based on PfGARP binding, a subset of the 160,000 compound small molecule ChemBridge DIVERset library was screened to identify compounds that inhibit the binding of anti-PfGARP antibody to rPfGARP protein. It was reasoned that compounds which bind to the same region of PfGARP that is targeted by the parasite-lethal anti-PfGARP antibodies will be enriched for effective anti-malarial drugs. A subset (6,400 compounds) of the 160,000 compound ChemBridge library was screened for inhibition of binding between bead-immobilized PfGARP and polyclonal anti-PfGARP antibodies. Following the identification of a lead compound with anti-parasite activity in parasite growth assays through the screen, a structure-activity relationship (SAR) was performed on structurally-related analog compounds having the same backbone, but varying R groups to identify additional compounds with enhanced parasite-killing activity compared to the parent compound with an $IC_{50}$ of 1.8-4.8 μM in 3D7 parasites and no activity in PfGARP-KO parasites, indicating specificity for PfGARP. Treatment with the lead compound resulted in rapid loss of mitochondrial membrane polarity, caspase-like activation, release of $Ca^{2+}$ from the food vacuole and DNA fragmentation—all hallmarks of parasite programmed cell death (PCD) seen in anti-PfGARP treated parasites. Toxicity assessments in human monocytes, lymphocytes and BeWo cells treated showed no loss of viability or proliferative capacity at up to 400 μM, the highest concentration tested.

This is ~100 fold higher than the $IC_{50}$ for parasites. SPR studies demonstrated specific binding to PfGARP ($K_D$=29.9 and 24.4 nM).

The present invention provides small molecule compounds for the treatment of *P. falciparum* malaria. Notably, these small molecules do not kill parasites that do not express PfGARP (showing both specificity of the mechanism of action as well as providing evidence for limited off-target toxicity in eukaryotic cells). Since there has never been an antimalarial drug that specifically activates apoptosis, the compositions of the present invention represent a whole new class of antimalarial drugs.

The compounds include a compound of Formula I, a prodrug or a pharmaceutically acceptable salt thereof:

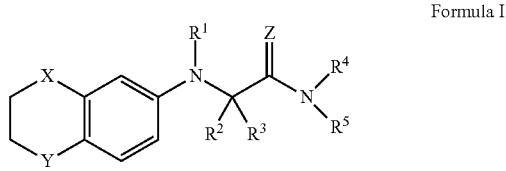

Formula I wherein:
X and Y are independently selected from O, S, $CH_2$, $NR^{11}$, $C=CH^2$, SO, $SO_2$, and $NR^{12}$;
Z is selected from O, $CH_2$, and S;
$R^1$ is selected from H, S—$R^{13}$, SO—$R^{13}$, and $SO_2R^{13}$;
$R^2$ and $R^3$ independently are selected from H, $C_{1-4}$ alkyl, $C_{3-5}$-cycloalkyl, $C_{2-4}$ alkene; $C_{3-5}$-cycloalkene, alternatively, $R^2$ and $R^3$ along with the carbon atom to which they are attached represent C=O, C=S, or $C=CH_2$,
$R^4$ is selected from H, $C_{1-4}$ alkyl, $C_{3-5}$-cycloalkyl, $C_{2-4}$ alkene, $C_{3-5}$-cycloalkene, SO— $C_{1-4}$ alkyl, and $SO_2$— $C_{1-4}$ alkyl;
$R^5$ is selected from H, $C_{1-4}$ alkyl, $C_{1-4}$ substituted alkyl, $C_{3-10}$-cycloalkyl, bicycloalkyl, $C_{3-10}$-heterocycloalkyl, aryl, substituted aryl, aryl-$S(O)_n$—$C_{1-4}$ alkyl, heteroaryl, $(CH_2)_{0-5}$-heterocycloalkyl, and $(CH_2)_{1-5}$—N$(C_{1-4}$ alkyl$)_2$;
alternatively, $R^4$ and $R^5$ along with the nitrogen atom to which they are attached represent a substituted or unsubstituted saturated or unsaturated hetero-cycloalkyl ring;
$R^{11}$ and $R^{12}$ independently are selected from H, $C_{1-4}$ alkyl, $C_{3-5}$-cycloalkyl, $C_{2-4}$ alkene, $C_{3-5}$-cycloalkene, SO—$C_{1-4}$ alkyl, and $SO_2$— $C_{1-4}$ alkyl; and
$R^{13}$ is selected from $C_{1-4}$ alkyl, $C_{3-5}$ -cycloalkyl, $C_{2-4}$ alkene, and $C_{3-5}$ -cycloalkene; and
n represents an integer from 0 to 2.

In an alternative embodiment, the small molecule compounds include a compound of Formula I, wherein:
X and Y are independently selected from O and S;
Z is selected from O and $CH_2$;
$R^1$ is selected from H, SO—$R^{13}$, and $SO_2R^{13}$;
$R^2$ and $R^3$ independently are selected from H, $C_{1-4}$ alkyl, and $C_{3-5}$-cycloalkyl;
alternatively, $R^2$ and $R^3$ along with the carbon atom to which they are attached represent C=O or $C=CH_2$;
$R^4$ is selected from H, $C_{1-4}$ alkyl, $C_{3-5}$-cycloalkyl, and $SO_2$— $C_{1-4}$ alkyl;
$R^5$ is selected from H, $C_{1-2}$ alkyl, $C_{1-4}$ substituted alkyl, $C_{5-9}$-cycloalkyl, $C_{6-10}$ aryl, $C_{6-10}$ substituted aryl, aryl-$S(O)_n$—$C_{1-4}$ alkyl, $C_{5-6}$-heteroaryl, $(CH_2)_{0-5}$-heterocycloalkyl, bicycloheptane, $(CH_2)_{1-4}$—N$(C_{1-3}$ alkyl$)_2$ and $C_{4-6}$ heterocycloalkyl;

alternatively, $R^4$ and $R^5$ along with the nitrogen atom to which they are attached represent a substituted or unsubstituted saturated or unsaturated $C_{4-10}$ heterocycloalkyl ring;
$R^{13}$ is selected from $C_{1-2}$ alkyl, and $C_{3-4}$-cycloalkyl; and
n represents an integer from 0 to 1.

In another alternative embodiment, the small molecule compounds include a compound of Formula I, wherein:
X and Y independently represent O;
Z represents O;
$R^1$ is selected from H and $SO_2R^{13}$;
$R^2$ and $R^3$ independently are selected from H and methyl;
alternatively, $R^2$ and $R^3$ along with the carbon atom to which they are attached represent C=O;
$R^4$ is selected from H, $CH_3$, and $SO_2$— $CH_3$;
$R^5$ is selected from H, phenyl, dimethyl-phenyl, methoxyphenyl, ethoxy-phenyl, cyclopropyl, cyclohexyl, cyclooctyl, cycloheptyl, methyl, toluyl, cyclopentyl, difluoro-phenyl, $(CH_2)_{0-3}$-heterocycloalkyl, chlorophenyl, iodo-phenyl, pyridyl, Ph-O-Ph, thiomethyl-phenyl, $(CH_2)_{1-3}$—N$(C_{1-3}$ alkyl$)_2$ and fluoro-phenyl;
alternatively, $R^4$ and $R^5$ along with the nitrogen atom to which they are attached represent a substituted or unsubstituted saturated or unsaturated $C_{5-9}$ hetero-cycloalkyl ring; and
$R^{13}$ is represents methyl.

In yet another alternative embodiment, the small molecule compounds include a compound of Formula I, wherein:
$R^4$ and $R^5$ along with the nitrogen atom to which they are attached represent:

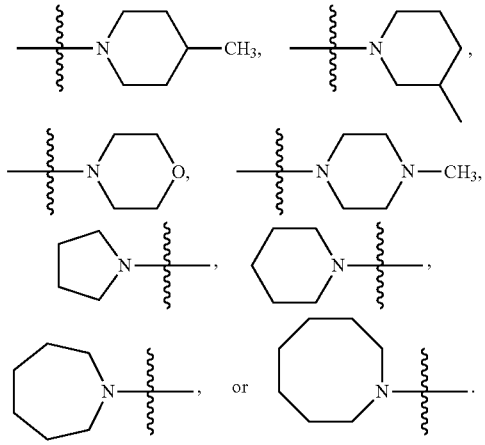

In another alternative embodiment, the small molecule compounds include a compound of Formula I, a prodrug or a pharmaceutically acceptable salt thereof:

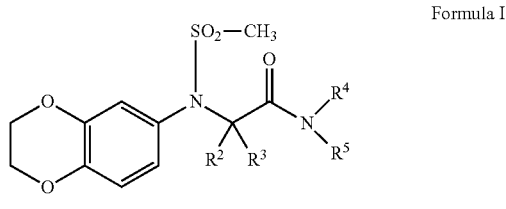

Formula I wherein:

$R^2$ represents H;

$R^3$ represents H or $CH_3$;

$R^4$ is selected from H, $CH_3$, and $SO_2$—$CH_3$;

$R^5$ is selected from H, phenyl, dimethyl-phenyl, cyclohexyl, cyclopropyl, cyclooctyl, cycloheptyl, methyl, cyclopentyl, pyridyl, $(CH_2)_3$-pyrrodyl, $(CH_2)_3$—$N(CH_3)_2$,

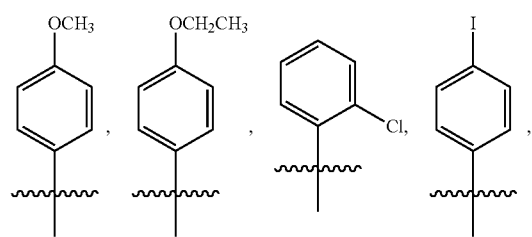

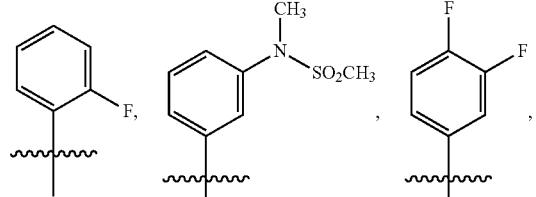

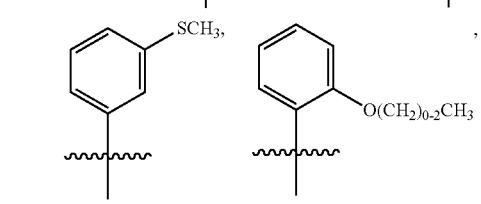

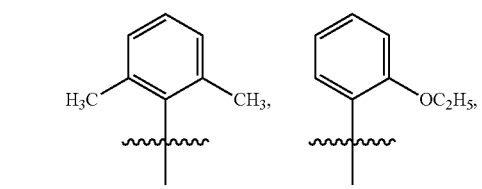

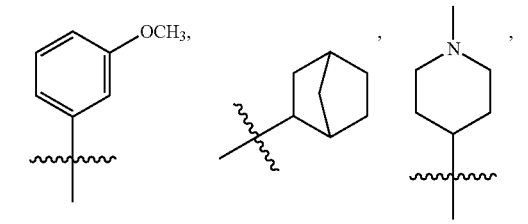

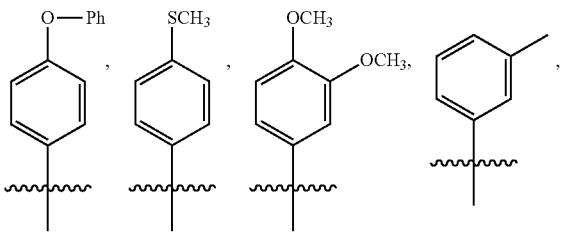

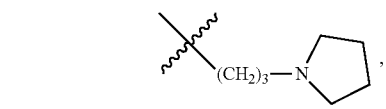

Alternatively, $R^4$ and $R^5$ along with the nitrogen atom to which they are attached represent:

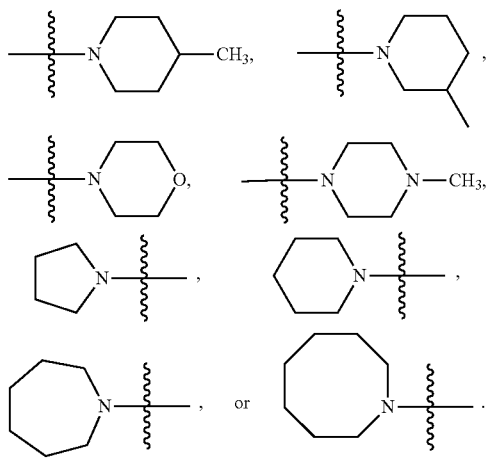

In another embodiment, the small molecule compounds include a compound selected from:

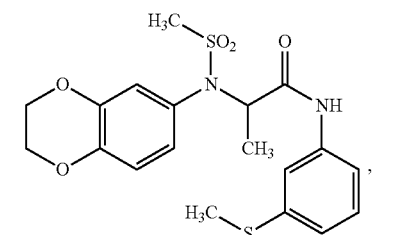

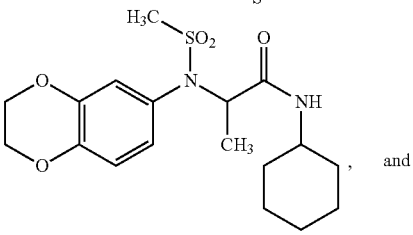

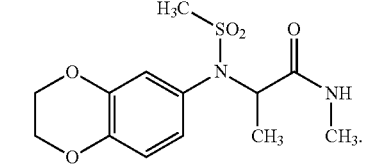

a prodrug or a pharmaceutically acceptable salt thereof.

In another embodiment, the small molecule compounds include a compound selected from:

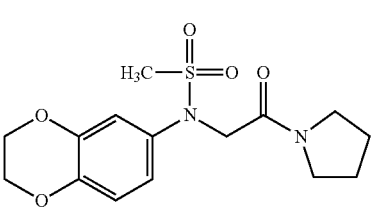

7641147
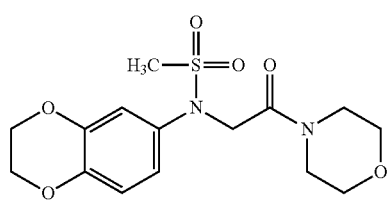
9072406
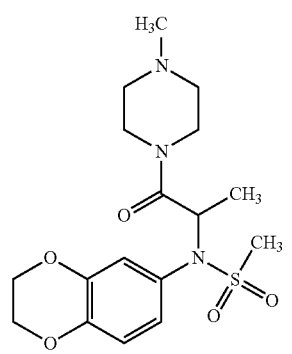
9072806
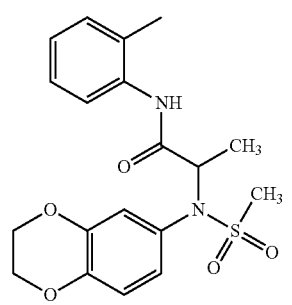
9074663
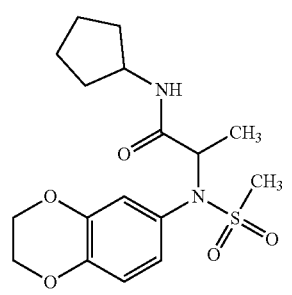
9075078
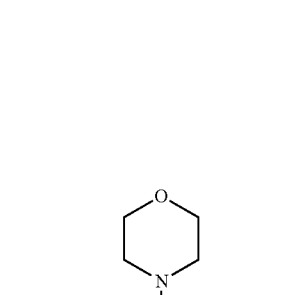
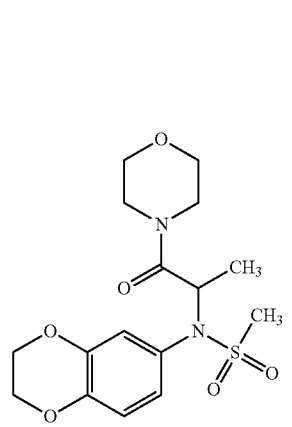
9076661
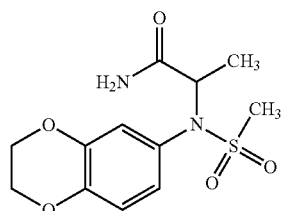
7626390
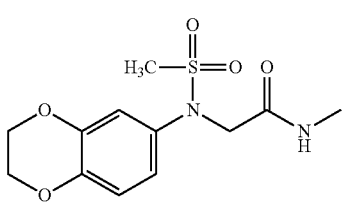
9082855
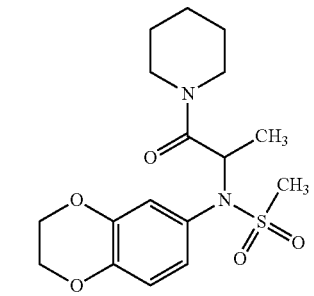
9082916
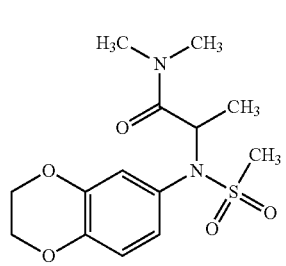
9083000
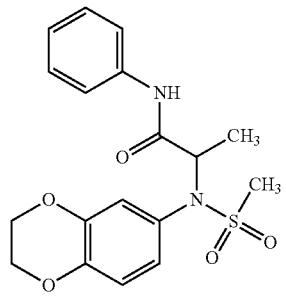
9083607
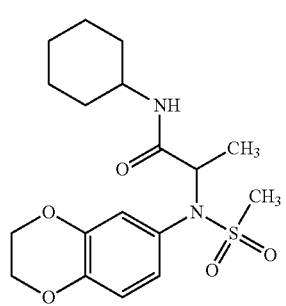

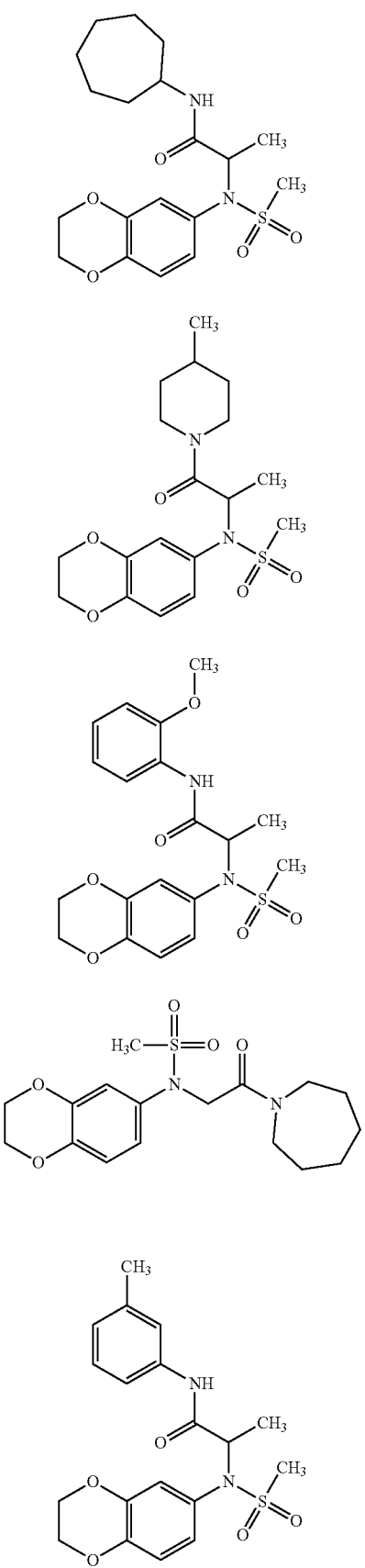

-continued

9084931
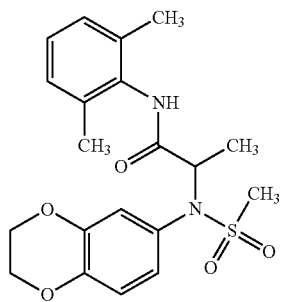

9080993
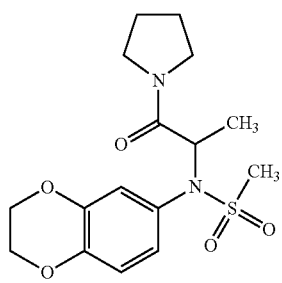

9077487
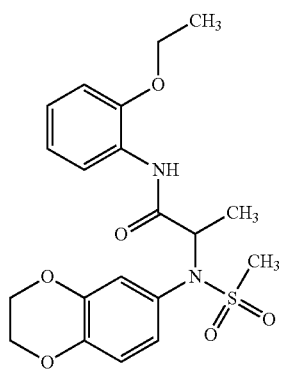

9078424
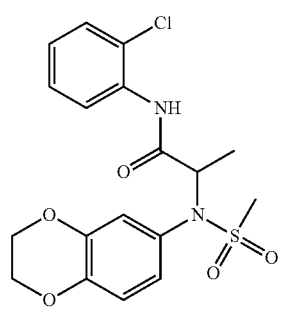

a prodrug or a pharmaceutically acceptable salt thereof.

In another embodiment, the small molecule compounds include a compound selected from:

9081579
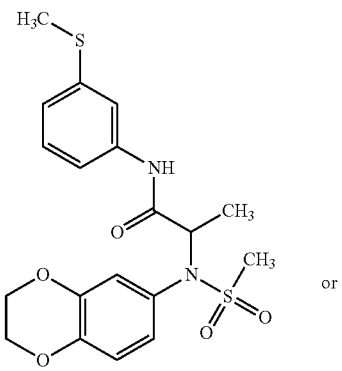

or

9078424
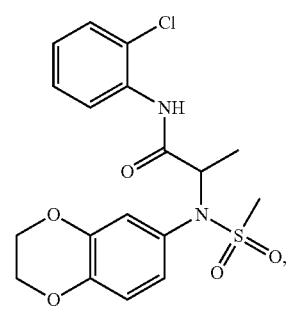

a prodrug or a pharmaceutically acceptable salt thereof.

In another aspect, the present invention provides a method of treating a subject afflicted with, or at risk of, a *P. falciparum* malaria infection. Existing antimalarial drugs in the art exert their effects via internal cellular targets. In contrast, the small molecule therapeutic antimalarial compounds of the present invention bind to PfGARP located on the exofacial surface of RBCs. The method involves administering to the subject a therapeutic agent that bind to PfGARP, which leads to the activation of programmed cell death in parasites by inducing apoptosis in cells that express PfGARP but does not activate apoptosis in subject host cells or parasite cells that do not express PfGARP. This represents a novel targeting and therapeutic mechanism for the treatment of *P. falciparum* malaria infections.

In some embodiments, the therapeutic agent is a compound of Formula I, a prodrug or a pharmaceutically acceptable salt thereof:

Formula I
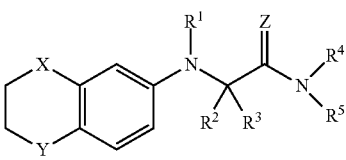

wherein:
X and Y are independently selected from O, S, $CH_2$, $NR^{11}$, $C=CH_2$, SO, $SO_2$, and $NR^{12}$;
Z is selected from O, $CH_2$, and S;
$R^1$ is selected from H, $S-R^{13}$, $SO-R^{13}$, and $SO_2R^{13}$;
$R^2$ and $R^3$ independently are selected from H, $C_{1-4}$ alkyl, $C_{3-5}$-cycloalkyl, $C_{2-4}$ alkene; $C_{3-5}$-cycloalkene, alternatively, $R^2$ and $R^3$ along with the carbon atom to which they are attached represent C=O, C=S, or C=CH$_2$;

$R^4$ is selected from H, $C_{1-4}$ alkyl, $C_{3-5}$-cycloalkyl, $C_{2-4}$ alkene, $C_{3-5}$-cycloalkene, SO—$C_{1-4}$ alkyl, and SO$_2$—$C_{1-4}$ alkyl;

$R^5$ is selected from H, $C_{1-4}$ alkyl, $C_{1-4}$ substituted alkyl; $C_{3-10}$-cycloalkyl, bicycloalkyl, $C_{3-10}$-heterocycloalkyl, aryl, substituted aryl, aryl-S(O)$_n$—$C_{1-4}$ alkyl, heteroaryl, (CH$_2$)$_{0-5}$-heterocycloalkyl, and (CH$_2$)$_{1-5}$—N($C_{1-4}$ alkyl)$_2$;

alternatively, $R^4$ and $R^5$ along with the nitrogen atom to which they are attached represent a substituted or unsubstituted saturated or unsaturated hetero-cycloalkyl ring;

$R^{11}$ and $R^{12}$ independently are selected from H, $C_{1-4}$ alkyl, $C_{3-5}$-cycloalkyl, $C_{2-4}$ alkene, $C_{3-5}$-cycloalkene, SO—$C_{1-4}$ alkyl, and SO$_2$—$C_{1-4}$ alkyl; and $R^{13}$ is selected from $C_{1-4}$ alkyl, $C_{3-5}$-cycloalkyl, $C_{2-4}$ alkene, and $C_{3-5}$-cycloalkene; and n represents an integer from 0 to 2.

In an alternative embodiment, the method involves administering to the subject a therapeutically-effective amount of a compound of Formula I, a prodrug or a pharmaceutically acceptable salt thereof, wherein:

X and Y are independently selected from O and S;

Z is selected from O and CH$_2$;

$R^1$ is selected from H, SO—$R^{13}$, and SO$_2R^{13}$;

$R^2$ and $R^3$ independently are selected from H, $C_{1-4}$ alkyl, and $C_{3-5}$-cycloalkyl;

alternatively, $R^2$ and $R^3$ along with the carbon atom to which they are attached represent C=O or C=CH$_2$;

$R^4$ is selected from H, $C_{1-4}$ alkyl, $C_{3-5}$-cycloalkyl, and SO$_2$—$C_{1-4}$ alkyl;

$R^5$ is selected from H, $C_{1-2}$ alkyl, $C_{1-4}$ substituted alkyl, $C_{5-9}$-cycloalkyl, $C_{6-10}$ aryl, $C_{6-10}$ substituted aryl, aryl-S(O)$_n$—$C_{1-4}$ alkyl, $C_{5-6}$-heteroaryl, (CH$_2$)$_{0-5}$-heterocycloalkyl, bicycloheptane, (CH$_2$)$_{1-4}$—N($C_{1-3}$ alkyl)$_2$ and $C_{4-6}$ heterocycloalkyl;

alternatively, $R^4$ and $R^5$ along with the nitrogen atom to which they are attached represent a substituted or unsubstituted saturated or unsaturated $C_{4-10}$ heterocycloalkyl ring;

$R^{13}$ is selected from $C_{1-2}$ alkyl, and $C_{3-4}$-cycloalkyl; and n represents an integer from 0 to 1.

In another alternative embodiment, the method involves administering to the subject a therapeutically-effective amount of a compound of Formula I, a prodrug or a pharmaceutically acceptable salt thereof, wherein:

X and Y independently represent O;

Z represents O;

$R^1$ is selected from H and SO$_2R^{13}$;

$R^2$ and $R^3$ independently are selected from H and methyl;

alternatively, $R^2$ and $R^3$ along with the carbon atom to which they are attached represent C=O;

$R^4$ is selected from H, CH$_3$, and SO$_2$—CH$_3$;

$R^5$ is selected from H, phenyl, dimethyl-phenyl, methoxy-phenyl, ethoxy-phenyl, cyclopropyl, cyclohexyl, cyclooctyl, cycloheptyl, methyl, toluyl, cyciopentyl, difluoro-phenyl, (CH$_2$)$_{0-3}$-heterocycloalkyl, chloro-phenyl, iodo-phenyl, pyridyl, Ph-O-Ph, thiomethyl-phenyl, (CH$_2$)$_{1-3}$—N($C_{1-3}$ alkyl)$_2$ and fluoro-phenyl;

alternatively, $R^4$ and $R^5$ along with the nitrogen atom to which they are attached represent a substituted or unsubstituted saturated or unsaturated $C_{5-9}$ heterocycloalkyl ring; and $R^{13}$ is represents methyl.

In yet another alternative embodiment, the method involves administering to the subject a therapeutically-effective amount of a compound of Formula I, a prodrug or a pharmaceutically acceptable salt thereof, wherein:

$R^4$ and $R^5$ along with the nitrogen atom to which they are attached represent:

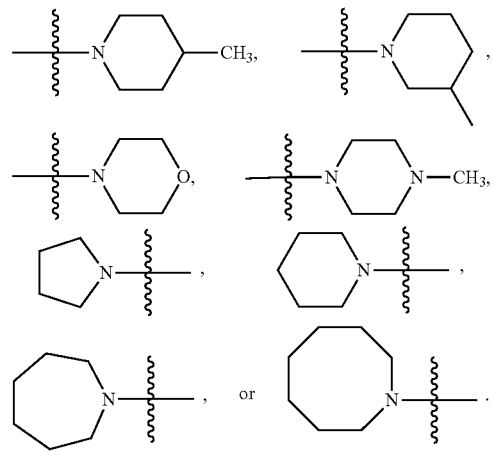

In an alternative embodiment, the present invention provides a method of treating a subject afflicted with, or at risk of, a *P. falciparum* malaria infection. The method involves administering to the subject a therapeutically-effective amount of a compound of Formula I, a prodrug or a pharmaceutically acceptable salt thereof:

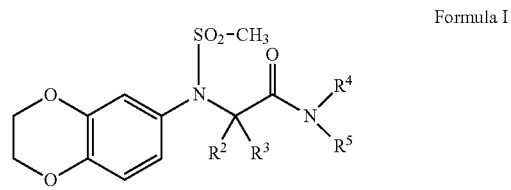

Formula I wherein:

$R^2$ represents H;

$R^3$ represents H or CH$_3$;

$R^4$ is selected from H, CH$_3$, and SO$_2$—CH$_3$;

$R^5$ is selected from H, phenyl, dimethyl-phenyl, cyclohexyl, cyclopropyl, cyclooctyl, cycloheptyl, methyl, cyclopentyl, pyridyl, (CH$_2$)$_3$-pyrrodyl, (CH$_2$)$_3$—N(CH$_3$)$_2$,

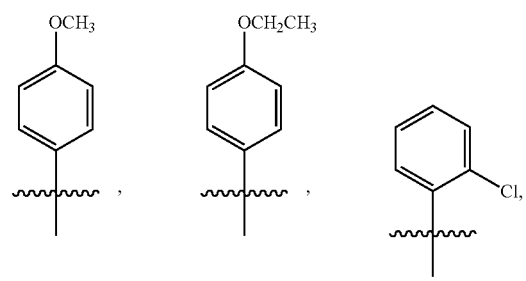

-continued

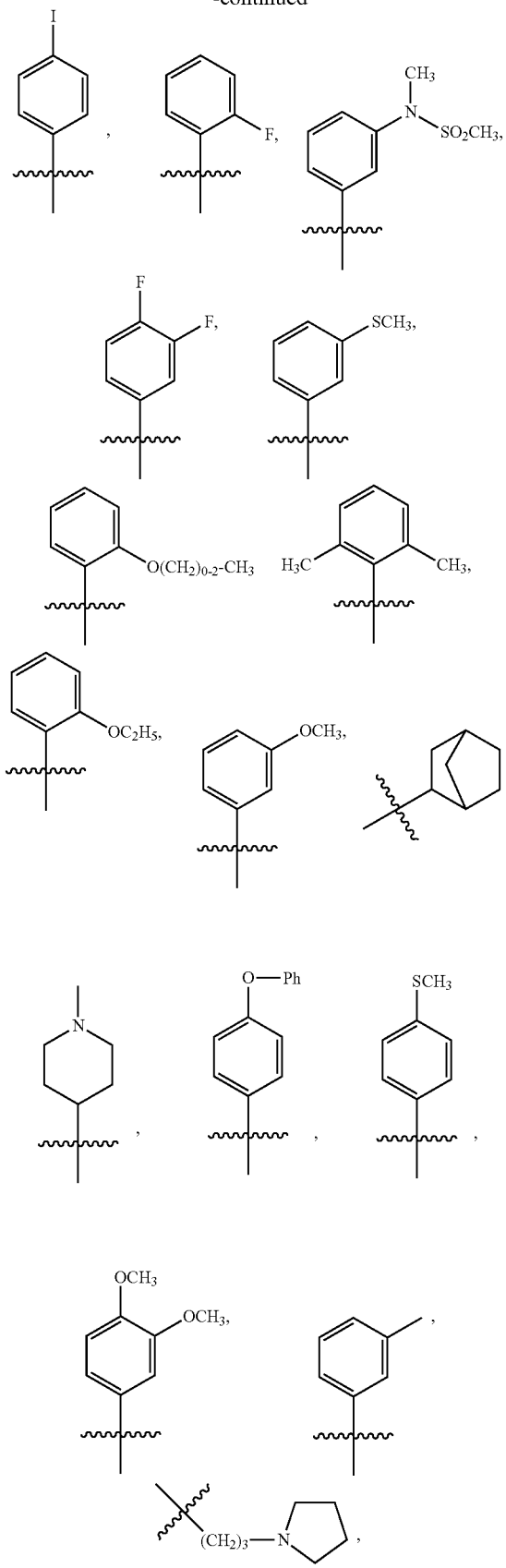

Alternatively, $R^4$ and $R^5$ along with the ogen atom to which they are attached represent:

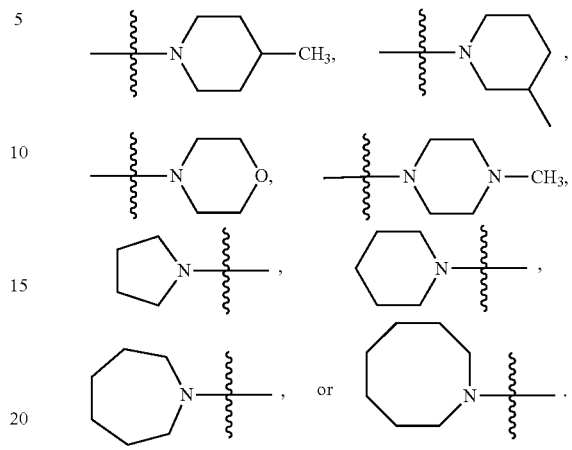

In an alternative embodiment, the method involves administering to the subject a therapeutically-effective amount of a compound selected from:

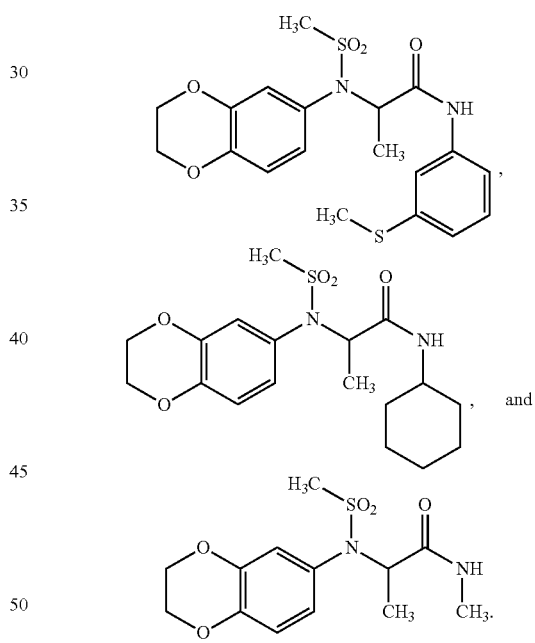

Other implementations are also described and recited herein.

BRIEF DESCRIPTION OF THE DRAWINGS

For the purpose of illustration, certain embodiments of the present invention are shown in the drawings described below. It should be understood, however, that the invention is not limited to the precise arrangements, dimensions, and instruments shown. In the drawings:

FIG. 4 shows small molecule therapeutic agents identified with the HTS as having malaria parasite killing activity.

DETAILED DESCRIPTION OF THE INVENTION

Figure 1:
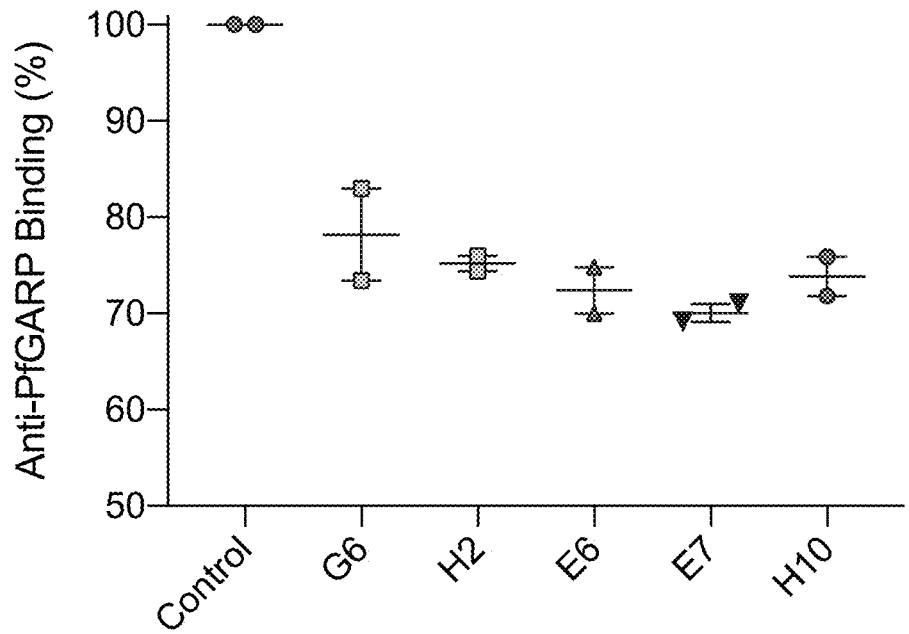
FIG. 1 is a graph demonstrating the inhibition of anti-PfGARP antibody binding to PfGARP by ChemBridge hits. Results presented for mixtures that resulted in greater than 20% inhibition of anti-PfGARP binding.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention.

The term "statistically significant" or "significantly" refers to statistical significance and generally means a two standard deviation (2SD) or greater difference.

As used herein, the term "subject" refers to a mammal, including but not limited to a dog, cat, horse, cow, pig, sheep, goat, chicken, rodent, or primate. Subjects can be house pets (e.g., dogs, cats), agricultural stock animals (e.g., cows, horses, pigs, chickens, etc.), laboratory animals (e.g., mice, rats, rabbits, etc.), but are not so limited. Subjects include human subjects. The human subject may be a pediatric, adult, or a geriatric subject. The human subject may be of either sex. A subject can be one who has been previously diagnosed or identified as having malaria, and optionally has already undergone, or is undergoing, a therapeutic intervention for the malaria. Alternatively, a subject can also be one who has not been previously diagnosed as having malaria, but who is at risk of developing such condition, e.g. due to infection, exposure to another subject having malaria, or due to travel within a region in which malaria is prevalent. A subject "at risk of developing malaria" in the context of the present invention refers to a subject who is living in an area where malaria is prevalent, such as the tropics and subtropics areas, or a subject who is traveling in such an area. Alternatively, a subject at risk of developing malaria can also refer to a subject who lives with or lives close by a subject diagnosed or identified as having malaria.

As used herein, the terms "effective amount" and "therapeutically-effective amount" include an amount sufficient to prevent or ameliorate a manifestation of disease or medical condition, such as malaria. It will be appreciated that there will be many ways known in the art to determine the effective amount for a given application. For example, the pharmacological methods for dosage determination may be used in the therapeutic context. In the context of therapeutic or prophylactic applications, the amount of a composition administered to the subject will depend on the type and severity of the disease and on the characteristics of the individual, such as general health, age, sex, body weight and tolerance to drugs. It will also depend on the degree, severity and type of disease. The skilled artisan will be able to determine appropriate dosages depending on these and other factors. The compositions can also be administered in combination with one or more additional therapeutic compounds.

As used herein, the terms "treat," "treatment," "treating," or "amelioration" when used in reference to a disease, disorder or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), diminishment of extent of the deficit, stabilized (i.e., not worsening) state of malaria, delay or slowing of malaria, and an increased lifespan as compared to that expected in the absence of treatment.

As used herein, the term " therapeutic agent" means refers to any agent that, when administered to a subject, has a therapeutic effect and/or elicits a desired biological and/or pharmacological effect. In some embodiments, a therapeutic agent is any substance that can be used to alleviate, ameliorate, relieve, inhibit, prevent, delay onset of, reduce severity of, and/or reduce incidence of one or more symptoms or features of a disease, disorder, and/or condition (e.g., one or more symptoms or features of $P.\ falciparum$ malaria).

As used herein, the term "long-term" administration means that the therapeutic agent or drug is administered for a period of at least 12 weeks. This includes that the therapeutic agent or drug is administered such that it is effective over, or for, a period of at least 12 weeks and does not necessarily imply that the administration itself takes place for 12 weeks, e.g., if sustained release compositions or long acting therapeutic agent or drug is used. Thus, the subject is treated for a period of at least 12 weeks. In many cases, long-term administration is for at least 4, 5, 6, 7, 8, 9 months or more, or for at least 1, 2, 3, 5, 7 or 10 years, or more.

The administration of the compositions contemplated herein may be carried out in any convenient manner, including by aerosol inhalation, injection, ingestion, transfusion, implantation or transplantation. In a preferred embodiment, compositions are administered parenterally. The phrases "parenteral administration" and "administered parenterally" as used herein refers to modes of administration other than enteral and topical administration, usually by injection, and includes, without limitation, intravascular, intravenous, intramuscular, intraarterial, intrathecal, intracapsular, intraorbital, intratumoral, intracardiac, intradermal, intraperitoneal, transtracheal, subcutaneous, subcuticular, intraarticular, subcapsular, subarachnoid, intraspinal and intrasternal injection and infusion. In one embodiment, the compositions contemplated herein are administered to a subject by direct injection into a tumor, lymph node, or site of infection.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

Compounds described herein may have asymmetric centers. Compounds of the present invention containing an asymmetrically substituted atom may be isolated in optically active or racemic forms. It is well known in the art how to prepare optically active forms, such as by resolution of racemic forms or by synthesis from optically active starting materials. Many geometric isomers of olefins, C=N double bonds, and the like can also be present in the compounds described herein, and all such stable isomers are contemplated in the present invention. Cis and trans geometric isomers of the compounds of the present invention are described and may be isolated as a mixture of isomers or as separated isomeric forms. All chiral, diastereomeric, racemic forms and all geometric isomeric forms of a structure are intended, unless the specific stereochemistry or isomeric form is specifically indicated.

One enantiomer of a compound of Formula I may display superior activity compared with the other. Thus, all of the stereochemistries are considered to be a part of the present invention. When required, separation of the racemic material can be achieved by HPLC using a chiral column or by a resolution using a resolving agent such as camphonic chloride as in Young et al. (1995).[11]

The term "substituted," as used herein, means that any one or more hydrogens on the designated atom or ring is replaced with a selection from the indicated group, provided that the designated atom's or ring atom's normal valency is not exceeded, and that the substitution results in a stable compound. When a substituent is keto (i.e., =O), then two hydrogens on the atom are replaced.

The term "optionally substituted" in reference to a particular moiety of the compound of Formula I (e.g., an optionally substituted heteroaryl group) refers to a moiety having 0, 1, 2, or more substituents. For example, "optionally substituted alkyl" encompasses both "alkyl" and "substituted alkyl" as defined below. It will be understood by those skilled in the art, with respect to any group containing one or more substituents, that such groups are not intended to introduce any substitution or substitution patterns that are sterically impractical, synthetically non-feasible and/or inherently unstable.

When any variable (e.g., $R^{13}$) occurs more than one time in any constituent or formula for a compound, its definition at each occurrence is independent of its definition at every other occurrence. Thus, for example, if a group is shown to be substituted with 0-2 $R^{13}$, then said group may optionally be substituted with up to two $R^{13}$ groups and $R^{13}$ at each occurrence is selected independently from the definition of $R^{13}$. Also, combinations of substituents and/or variables are permissible only if such combinations result in stable compounds.

As used herein, "alkyl" or "$C_{1-8}$ alkyl" is intended to include both branched and straight-chain saturated aliphatic hydrocarbon groups having the specified number of carbon atoms, examples of which include, but are not limited to, methyl, ethyl, n-propyl, i-propyl, n-butyl, i-butyl, sec-butyl, t-butyl, pentyl, and hexyl. $C_{1-8}$ alkyl, is intended to include $C_1$, $C_2$, $C_3$, $C_4$, $C_5$, $C_6$, $C_7$, and $C_8$ alkyl groups. "Alkenyl" is intended to include hydrocarbon chains of either a straight or branched configuration and one or more unsaturated carbon-carbon bonds which may occur in any stable point along the chain, such as ethenyl, propenyl, and the like. "Alkynyl" is intended to include hydrocarbon chains of either a straight or branched configuration and one or more unsaturated triple carbon-carbon bonds which may occur in any stable point along the chain, such as ethynyl, propynyl, and the like. "$C_{3-6}$ cycloalkyl" is intended to include saturated ring groups having the specified number of carbon atoms in the ring, including mono-, bi-, or poly-cyclic ring systems, such as cyclopropyl, cyclobutyl, cyclopentyl, cyclohexyl, and cycloheptyl in the case of $C_7$ cycloalkyl. $C_{3-6}$ cycloalkyl, is intended to include $C_3$, $C_4$, $C_5$, and $C_6$ cycloalkyl groups.

When the term "alkyl" is used together with another group, such as in "arylalkyl", this conjunction defines with more specificity at least one of the substituents that the substituted alkyl will contain. For example, "arylalkyl" refers to a substituted alkyl group as defined above where at least one of the substituents is an aryl, such as benzyl. Thus, the term aryl($C_{0-4}$)alkyl includes a substituted lower alkyl having at least one aryl substituent and also includes an aryl directly bonded to another group, i.e., aryl($C_0$)alkyl. The term "heteroarylalkyl" refers to a substituted alkyl group as defined above where at least one of the substituents is a heteroaryl.

The term "alkoxy" refers to an oxygen atom substituted by alkyl or substituted alkyl, as defined herein. For example, the term "alkoxy" includes the group —O—$C_{1-6}$ alkyl such as methoxy, ethoxy, propoxy, isopropoxy, n-butoxy, sec-butoxy, tert-butoxy, pentoxy, 2-pentyloxy, isopentoxy, neopentoxy, hexoxy, 2-hexoxy, 3-hexoxy, 3-methylpentoxy, and the like. "Lower alkoxy" refers to alkoxy groups having one to four carbons.

"Halo" or "halogen" as used herein refers to fluoro, chloro, bromo, and iodo; and "haloalkyl" is intended to include both branched and straight-chain saturated aliphatic hydrocarbon groups, for example $CF_3$, having the specified number of carbon atoms, substituted with 1 or more halogen (for example —$C_vF_w$, where v=1 to 3 and w=1 to (2v+1)).

As used herein, "cycloalkyl" is intended to mean any stable 3 to 10 membered monocyclic or bicyclic or 7, 8, 9, 10, 11, 12, or 13-membered bicyclic or tricyclic, any of which may be saturated, or partially unsaturated. Examples of such cycloalkyl substituents include, but are not limited to, cyclopropyl, cyclobutyl, cyclopentyl, cyclohexyl, cycloheptyl, adamantyl, cyclooctyl; [3.3.0]bicyclooctane, [4.3.0]bicyclononane, [4.4.0]bicyclodecane (decalin), [2.2.2]bicyclooctane, fluorenyl, phenyl, naphthyl, indanyl, adamantyl, or tetrahydronaphthyl (tetralin).

As used herein, the term "heterocycle" or "heterocyclic system" is intended to mean a stable 5, 6, or 7-membered monocyclic or bicyclic or 7, 8, 9, or 10-membered bicyclic heterocyclic ring, which is saturated, partially unsaturated or unsaturated (aromatic), and which consists of carbon atoms and 1, 2, 3, or 4 heteroatoms independently selected from the group consisting of N, NH, O and S and including any bicyclic group in which any of the above-defined heterocyclic rings is fused to a benzene ring. The nitrogen and sulfur heteroatoms may optionally be oxidized. The heterocyclic ring may optionally include a —C(O)—, carbonyl. The heterocyclic ring may be attached to its pendant group at any heteroatom or carbon atom which results in a stable structure. The heterocyclic rings described herein may be substituted on carbon or on a nitrogen atom if the resulting compound is stable. If specifically noted, a nitrogen in the heterocycle may optionally be quaternized. It is preferred that, when the total number of S and O atoms in the heterocycle exceeds 1, then these heteroatoms are not adjacent to one another. As used herein, the term "aromatic heterocyclic system" or "heteroaryl" is intended to mean a stable 5- to 7-membered monocyclic or bicyclic or 7- to 10-membered bicyclic heterocyclic aromatic ring which consists of carbon atoms and from 1 to 4 heteroatoms independently selected from the group consisting of N, O and S and is aromatic in nature.

The term "aryl" refers to monocyclic or bicyclic aromatic hydrocarbon groups having 6 to 12 carbon atoms in the ring portion, such as phenyl, and naphthyl groups, each of which may be substituted. Thus, examples of aryl groups include:

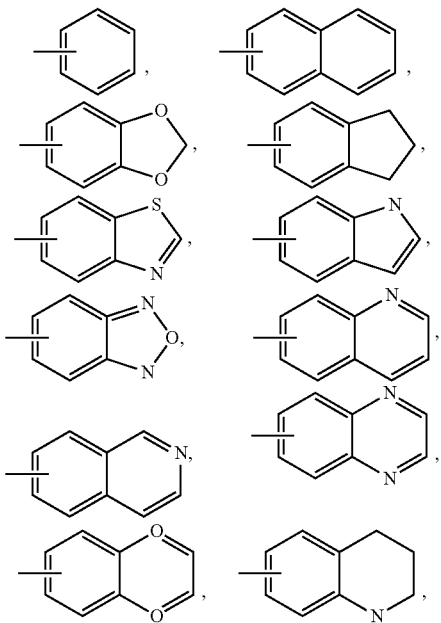
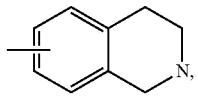
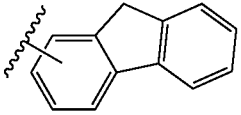

(fluorenyl) and the like, which optionally may be substituted at any available carbon or nitrogen atom. A preferred aryl group is optionally-substituted phenyl.

Examples of heterocycles include, but are not limited to, 1H-indazole, 2-pyrrolidonyl, 2K6H-1,5,2-dithiazinyl, 2H-pyrrolyl, 1H-indolyl, 4-piperidonyl, 4aH-carbazole, 4H-quinolizinyl, 6H-1,2,5-thiadiazinyl, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyi, carbazolyl, 4aH-carbazolyl, β-carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, indazolyl, indolenyl, indolinyl, indolizinyl, indolyl, isobenzofuranyl, isochromanyl, isoindazolyl, isoindolinyl, isoindolyl, isoquinolinyl (benzimidazolyl), isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinylperimidinyl, phenanthridinyl, phenanthrolinyl, phenarsazinyl, phenazinyl, phenothiazinyl, phenoxathiinyl, phenoxazinyl, phthalazinyl, piperazinyl, piperidinyl, pteridinyl, piperidonyl, 4-piperidonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, 4H-quinolizinyl, quinoxalinyl, quinuclidinyl, carbolinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, tetrazolyl, and xanthenyl. In another aspect of the invention, the heterocycles include, but are not limited to, pyridinyl, thiophenyl, furanyl, indazolyl, benzothiazolyl, benzimidazolyl, benzothiaphenyl, benzofuranyl, benzoxazolyl, benzisoxazolyl, quinolinyl, isoquinolinyl, imidazolyl, indolyl, isoidolyl, piperidinyl, piperidonyl, 4-piperidonyl, piperonyl, pyrrazolyl, 1,2,4-triazolyl, 1,2,3-triazolyl, tetrazolyl, thiazolyl, oxazolyl, pyrazinyl, and pyrimidinyl. Also included are fused ring and spiro compounds containing, for example, the above heterocycles.

Examples of heteroaryls are 1H-indazole, 2H,6H-1,5,2-dithiazinyl, indolyl, 4aH-carbazole, 4H-quinolizinyl, 6H-1,2,5-thiadiazinyl, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyl, carbazolyl, 4aH-carbazolyl, β-carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, indazolyl, indolenyl, indolinyl, indolizinyl, indolyl, isobenzofuranyl, isochromanyl, isoindazolyl, isoindolinyl, isoindolyl, isoquinolinyl (benzimidazolyl), isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinylperimidinyl, phenanthridinyl, phenanthrolinyl, phenarsazinyl, phenazinyl, phenothiazinyl, phenoxathiinyl, phenoxazinyl, phthalazinyl, piperazinyl, piperidinyl, pteridinyl, piperidonyl, 4-piperidonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, 4H-quinolizinyl, quinoxalinyl, quinuclidinyl, carbolinyl, tetrahydrofuranyl, tetrahydroisoquinolinyl, tetrahydroquinolinyl, 6H-1,2, 5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, tetrazolyl, and xanthenyl. In another aspect of the invention, examples of heteroaryls are indolyl, benzimidazolyl, benzofuranyl, benzothiofuranyl, benzoxazolyl, benzthiazolyl, benztriazolyl, benztetrazolyl, benzisoxazolyl, benzisothiazolyl, benzimidazalonyl, cinnolinyl, furanyl, imidazolyl, indazolyl, indolyl, isoquinolinyl isothiazolyl, isoxazolyl, oxazolyl, pyrazinyl, pyrazolyl, pyridazinyl, pyridyl, pyridinyl, pyrimidinyl, pyrrolyl, quinazolinyl, quinolinyl, thiazolyl, thienyl, and tetrazolyl.

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in The Merck Manual of Diagnosis and Therapy;[12] The Encyclopedia of Molecular Cell Biology and Molecular Medicine;[13] Molecular Biology and Biotechnology: a Comprehensive Desk Reference;[14] Immunology;[15] Janeway's Immunobiology;[16] Lewin's Genes XI;[17] Molecular Cloning: A Laboratory Manual.;[18] Basic Methods in Molecular Biology;[19] Laboratory Methods in Enzymology;[20] Current Protocols in Molecular Biology (CPMB);[21] Current Protocols in Protein Science (CPPS);[22] and Current Protocols in Immunology (CPI).[23]

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined herein within the description of the various aspects of the invention.

MALARIA

Malaria is a mosquito-borne infectious disease caused by a parasite. At least four species of malaria parasites can infect humans under natural conditions: *Plasmodium falciparum* (*P. falciparum*), *P. vivax*, *P. ovale*, and *P. malariae*. The first two species cause the most infections worldwide. *P. vivax* and *P. ovale* have dormant liver stage parasites (hypnozoites) that can reactivate (or "relapse") and cause malaria several months or years after the infecting mosquito bite. Consequently, these species can be difficult to detect in infected individuals. Severe disease is largely caused by *P. falciparum*, while the disease caused by *P. vivax*, *P. ovale*, and *P. malariae* is generally a milder disease that is rarely fatal.

In humans, the parasites grow and multiply first in the liver cells and then in the red blood cells (RBCs). In the blood, successive broods of parasites grow inside the red cells and destroy them, releasing daughter parasites (merozoites) that continue the cycle by invading other red cells. The blood stage parasites cause the symptoms of malaria. When certain forms of blood stage parasites, gametocytes, are picked up by a female Anopheles mosquito during a blood meal, they start another, different cycle of growth and multiplication in the mosquito. After 10-18 days, the parasites are found as sporozoites in the mosquito's salivary glands. When the Anopheles mosquito takes a blood meal from another human, the sporozoites are injected with the mosquito's saliva and start another human infection when they parasitize the liver cells.

Infection with malaria parasites can result in a wide variety of symptoms, typically including fever and headache, in severe cases progressing to coma or death. Children with severe malaria frequently develop one or more of the following symptoms: severe anemia, respiratory distress in relation to metabolic acidosis, or cerebral malaria. In adults, multi-organ failure is also frequent. In malaria endemic areas, people may develop partial immunity, allowing asymptomatic infections to occur.

There were an estimated 229 million cases of malaria worldwide in 2019. An estimated 409,000 people died from malaria in 2019 according to the World Health Organization. *P. falciparum*, the most severe form of malaria, is responsible for the vast majority of deaths associated with the disease. In 2018, *P. falciparum* accounted for 99.7% of estimated malaria cases in the WHO African Region, 50% of cases in the WHO South-East Asia Region, 71% of cases in the Eastern Mediterranean, and 65% in the Western Pacific. Children aged under 5 years are the most vulnerable group affected by malaria; in 2019, they accounted for 67% (274000) of all malaria deaths worldwide.

PLASMODIUM FALCIPARUM GLUTAMIC ACID RICH PROTEIN (PfGARP)

In our previous studies,[24,25] PfGARP, a ~80 kDa parasite antigen expressed on the exofacial surface of trophozoite-infected RBCs (iRBC) as a target of antibodies that kill parasites. Naturally-occurring antibodies to PfGARP demonstrated significant killing of trophozoite infected iRBCs by an apoptosis-like mechanism that involves disruption of mitochondrial membrane potential and food vacuole integrity with activation of caspase-like enzymes. In addition, vaccination of non-human primates with soluble PfGARP in Ribi adjuvant or as a lipid encapsulated mRNA resulted in significant protection from *P. falciparum* challenge compared to adjuvant only controls.

Parasites that were treated with anti-PfGARP displayed several canonical features of programmed cell death, including (i) shrunken, pyknotic nuclei; (ii) a loss of mitochondrial membrane integrity; (iii) the activation of caspase-like proteases; (iv) DNA fragmentation; and (v) the release of calcium from intracellular stores. Although *P. falciparum* lacks classic caspases,[26] it does encode three meta-caspases, and activation of *P. falciparum* metacaspase 1 (PfMCA1) functions as an upstream activator of a caspase-like enzyme that leads to programmed cell death.[27] This ability to induce programmed cell death in *Plasmodium* parasites is a novel mode of action for an antimalarial antibody. Because PfGARP is located on the exofacial surface of RBCs, and because antibody engagement of PfGARP leads to the activation of programmed cell death in parasites, we speculated that PfGARP might function in the density-dependent regulation of parasitaemia by sensing either parasite or host factors.

In non-human primates, immunization with PfGARP, as either an mRNA-based or a recombinant-protein-based immunogen, conferred marked protection against parasitaemia compared with controls after a heterologous challenge with *P. falciparum*. This represented the first report of an mRNA-based vaccine that induces protection against *P. falciparum*.

In longitudinal cohort studies, naturally-occurring anti-PfGARP predicted a decreased risk of severe malaria in children and decreased parasitaemia in adolescents and adults. Together, our data supported PfGARP as a vaccine candidate against malaria caused by *P. falciparum*.

NOVEL ANTI-MALARIAL DRUGS

The present invention was based on the premises that (i) PfGARP represented a high value druggable target (given the PfGARP surface expression on infected RBCs, the absence of any significant amino acid homology with human host proteins, and the ability of antibody binding to PfGARP to kill essentially all parasites within 12-24 hours) and (ii) our recombinant monoclonal anti-PfGARP antibody could be used in high-throughput drug screens that target PfGARP-induced programmed cell death.

As described herein, a high throughput drug screen was devised to search for small molecules that mimic the binding of anti-PfGARP antibodies to PfGARP. The hits from this HTS screening assay were tested in parasite-killing assays. Several small molecules drugs that bind to PfGARP and kill parasites in culture were identified. These small molecules antimalarial drugs are defined as a compound of Formula I, a prodrug or a pharmaceutically acceptable salt thereof:

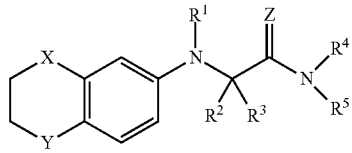

Formula I wherein:
X and Y are independently selected from O, S, $CH_2$, $R^{11}$, $C=CH_2$, SO, $SO_2$, and $NR^{12}$;
Z is selected from O, $CH_2$, and S;
$R^1$ is selected from H, $S-R^{13}$, $SO-R^{13}$, and $SO_2R^{13}$;
$R^2$ and $R^3$ independently are selected from H, $C_{1-4}$ alkyl, $C_{3-5}$-cycloalkyl, $C_{2-4}$ alkene; $C_{3-5}$-cycloalkene, alternatively, $R^2$ and $R^3$ along with the carbon atom to which they are attached represent C=O, C=S, or $C=CH_2$;
$R^4$ is selected from H, $C_{1-4}$ alkyl, $C_{3-5}$-cycloalkyl, $C_{2-4}$ alkene, $C_{3-5}$-cycloalkene, $SO-C_{1-4}$ alkyl, and $SO_2-C_{1-4}$ alkyl;
$R^5$ is selected from H, $C_{1-4}$ alkyl, $C_{1-4}$ substituted alkyl, $C_{3-10}$-cycloalkyl, bicycloalkyl, $C_{3-10}$-heterocycloalkyl, aryl, substituted aryl, aryl-S(O)$_n$-$C_{1-4}$ alkyl, heteroaryl, $(CH_2)_{0-5}$-heterocycloalkyl, and $(CH_2)_{1-5}$-N$(C_{1-4}$ alkyl$)_2$;
alternatively, $R^4$ and $R^5$ along with the nitrogen atom to which they are attached represent a substituted or unsubstituted saturated or unsaturated hetero-cycloalkyl ring;

$R^{11}$ and $R^{12}$ independently are selected from H, $C_{1-4}$ alkyl, $C_{3-5}$-cycloalkyl, $C_{2-4}$ alkene, $C_{3-5}$-cycloalkene, $SO-C_{1-4}$ alkyl, and $SO_2-C_{1-4}$ alkyl; and
$R^{13}$ is selected from $C_{1-4}$ alkyl, $C_{3-5}$-cycloalkyl, $C_{2-4}$ alkene, and $C_{3-5}$-cycloalkene; and
n represents an integer from 0 to 2.

Notably, these small molecules do not kill parasites that do not express PfGARP (showing both specificity of the mechanism of action as well as providing evidence for limited off-target toxicity in eukaryotic cells). Since there has never been an antimalarial drug that specifically activates apoptosis, the compositions of the present invention represent a whole new class of antimalarial drugs.

Some embodiments of the technology described herein can be defined according to any of the following numbered paragraphs:

1. A method of treating *P. falciparum* malaria comprising administering to a subject in need thereof a therapeutically-effective amount of a therapeutic agent that specifically bind to *P. falciparum* glutamic-acid-rich proteins (PfGARP) located on the exofacial surface of red blood cells (RBCs) infected with *P. falciparum*.
2. The method of paragraph 1, wherein the binding to PfGARP leads to a specific activation of programmed cell death by inducing apoptosis in cells that express PfGARP but does not activate apoptosis in subject host cells or parasite cells that do not express PfGARP.
3. The method of paragraph 2, wherein the therapeutic agent is a small molecule.
4. The method of paragraph 3, wherein the small molecule therapeutic agent is a compound of Formula I, a prodrug or a pharmaceutically acceptable salt thereof:

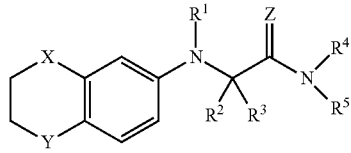

Formula I wherein:
X and Y are independently selected from O, S, $CH_2$, $NR^{11}$, $C=CH_2$, SO, $SO_2$, and $NR^{12}$;
Z is selected from O, $CH_2$, and S;
$R^1$ is selected from H, $S-R^{13}$, $SO-R^{13}$, and $SO_2R^{13}$;
$R^2$ and $R^3$ independently are selected from H, $C_{1-4}$ alkyl, $C_{3-5}$-cycloalkyl, $C_{2-4}$ alkene; $C_{3-5}$-cycloalkene, alternatively, $R^2$ and $R^3$ along with the carbon atom to which they are attached represent C=O, C=S, or $C=CH_2$;
$R^4$ is selected from H, $C_{1-4}$ alkyl, $C_{3-5}$-cycloalkyl, $C_{2-4}$ alkene, $C_{3-5}$-cycloalkene, $SO-C_{1-4}$ alkyl, and $SO_2-C_{1-4}$ alkyl;
$R^5$ is selected from H, $C_{1-4}$ alkyl, $C_{1-4}$ substituted alkyl, $C_{3-10}$-cycloalkyl, bicycloalkyl, $C_{3-10}$-heterocycloalkyl, aryl, substituted aryl, aryl-S(O)$_n$-$C_{1-4}$ alkyl, heteroaryl, $(CH_2)_{0-5}$-heterocycloalkyl, and $(CH_2)_{1-5}$-N$(C_{1-4}$ alkyl$)_2$;
alternatively, $R^4$ and $R^5$ along with the nitrogen atom to which they are attached represent a substituted or unsubstituted saturated or unsaturated hetero-cycloalkyl ring;
$R^{11}$ and $R^{12}$ independently are selected from H, $C_{1-4}$ alkyl, $C_{3-5}$-cycloalkyl, $C_{2-4}$ alkene, $C_{3-5}$-cycloalkene, $SO-C_{1-4}$ alkyl, and $SO_2-C_{1-4}$ alkyl; and $R^{13}$ is selected from $C_{1-4}$ alkyl, $C_{3-5}$-cycloalkyl, $C_{2-4}$ alkene, and $C_{3-5}$-cycloalkene; and n represents an integer from 0 to 2.

5. The method of paragraph 4, wherein:
   X and Y are independently selected from O and S;
   Z is selected from O and $CH_2$;
   $R^1$ is selected from H, SO—$R^{13}$, and $SO_2R^{13}$;
   $R^2$ and $R^3$ independently are selected from H, $C_{1-4}$ alkyl, and $C_{3-5}$-cycloalkyl;
   alternatively, $R^2$ and $R^3$ along with the carbon atom to which they are attached represent C=O or C=$CH_2$;
   $R^4$ is selected from H, $C_{1-4}$ alkyl, $C_{3-5}$-cycloalkyl, and $SO_2$—$C_{1-4}$ alkyl;
   $R^5$ is selected from H, $C_{1-2}$ alkyl, $C_{1-4}$ substituted alkyl, $C_{5-9}$-cycloalkyl, $C_{6-10}$ aryl, $C_{6-10}$ substituted aryl, aryl-$S(O)_n$—$C_{1-4}$ alkyl, $C_{5-6}$-heteroaryl, $(CH_2)_{0-5}$-heterocycloalkyl, bicycloheptane, $(CH_2)_{1-4}$—$N(C_{1-3}$ alkyl$)_2$ and $C_{4-6}$ heterocycloalkyl;
   alternatively, $R^4$ and $R^5$ along with the nitrogen atom to which they are attached represent a substituted or unsubstituted saturated or unsaturated $C_{4-10}$ heterocycloalkyl ring;
   $R^{13}$ is selected from $C_{1-2}$ alkyl, and $C_{3-4}$-cycloalkyl; and
   n represents an integer from 0 to 1.

6. The method of paragraph 5, wherein:
   X and Y independently represent O;
   Z represents O;
   $R^1$ is selected from H and $SO_2R^{13}$;
   $R^2$ and $R^3$ independently are selected from H and methyl;
   alternatively, $R^2$ and $R^3$ along with the carbon atom to which they are attached represent C=O;
   $R^4$ is selected from H, $CH_3$, and $SO_2$—$CH_3$;
   $R^5$ is selected from H, phenyl, dimethyl-phenyl, methoxy-phenyl, ethoxy-phenyl, cyclopropyl, cyclohexyl, cyclooctyl, cycloheptyl, methyl, toluyl, cyclopentyl, difluoro-phenyl, $(CH_2)_{0-3}$-heterocycloalkyl, chloro-phenyl, iodo-phenyl, pyridyl, Ph-O-Ph, thiomethyl-phenyl, $(CH_2)_{1-3}$—$N(C_{1-3}$ alkyl$)_2$ and fluoro-phenyl;
   alternatively, $R^4$ and $R^5$ along with the nitrogen atom to which they are attached represent a substituted or unsubstituted saturated or unsaturated $C_{5-9}$ hetero-cycloalkyl ring; and
   $R^{13}$ is represents methyl.

7. The method of paragraph 6, wherein:
   $R^4$ and $R^5$ along with the nitrogen atom to which they are attached represent:

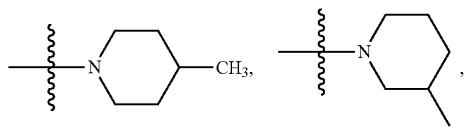

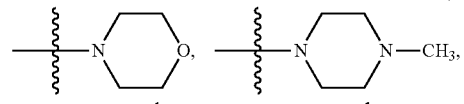

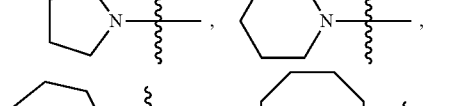

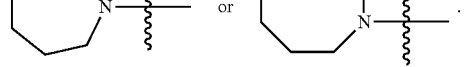

8. A method of treating *P. falciparum* malaria in a subject comprising administering to a subject in need thereof a therapeutically-effective amount of a compound of Formula I, a prodrug or a pharmaceutically acceptable salt thereof:

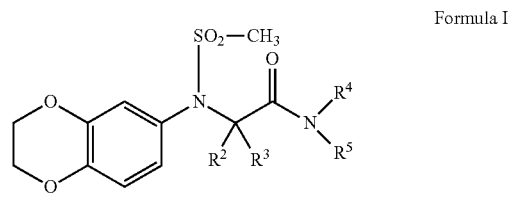

Formula I wherein:
$R^2$ represents H;
$R^3$ represents H or $CH_3$;
$R^4$ is selected from H, $CH_3$, and $SO_2$—$CH_3$;
$R^5$ is selected from H, phenyl, dimethyl-phenyl, cyclohexyl, cyclopropyl, cyclooctyl, cycloheptyl, methyl, cyclopentyl, pyridyl, $(CH_2)_3$-pyrrodyl, $(CH_2)_3$—$N(CH_3)_2$,

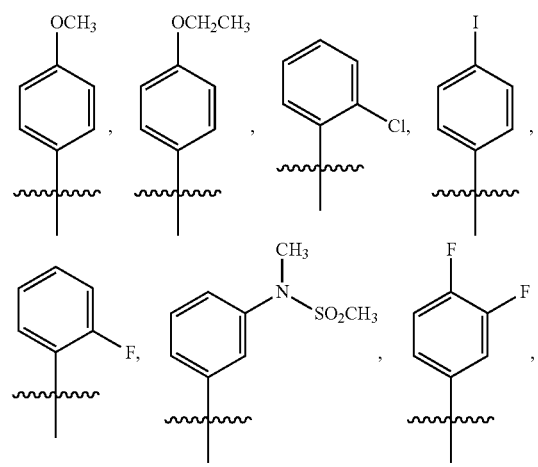

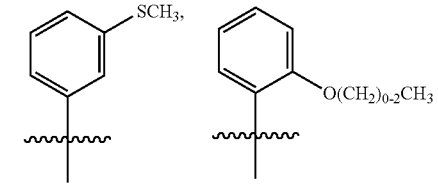

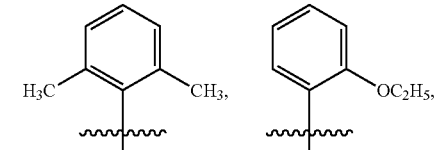

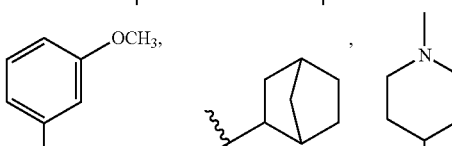

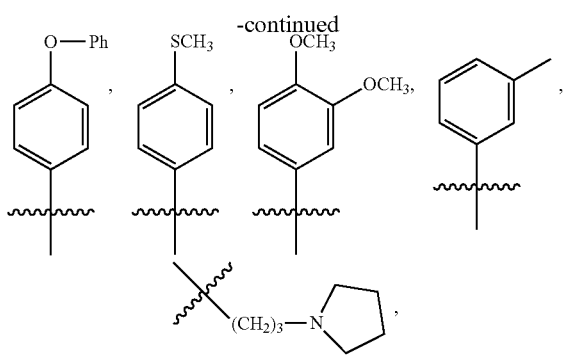

Alternatively, R⁴ and R⁵ along with the nitrogen atom to which they are attached represent:

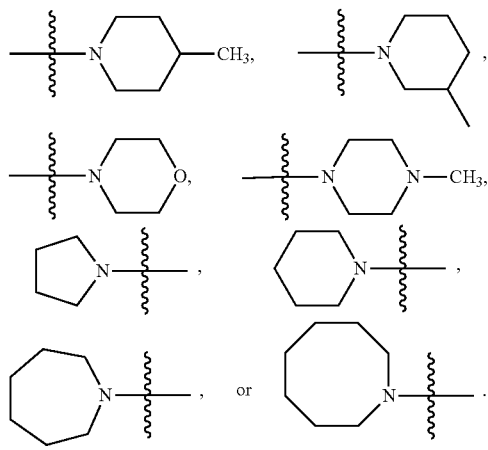

9. The method of paragraph 8, wherein the compound is selected from the group consisting of:

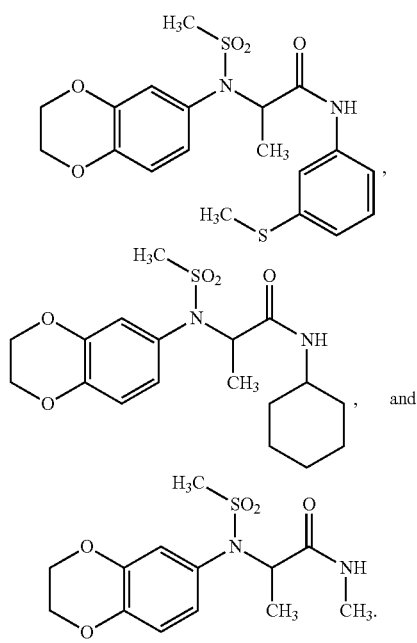

PHARMACEUTICAL COMPOSITIONS

The compositions and methods of the present invention may be utilized to treat an individual in need thereof. In certain embodiments, the individual is a mammal such as a human, or a non-human mammal. When administered to an animal, such as a human, the composition or the compound is preferably administered as a pharmaceutical composition comprising, for example, a compound of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In preferred embodiments, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as a lotion, cream, or ointment.

A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a self-emulsifying drug delivery system or a self-micro emulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); subcutaneously; transdermally (for example as a patch applied to the skin); and topically (for example, as a cream, ointment or spray applied to the skin). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragées, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropyl methyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragées, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropyl methyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, micro-emulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

The phrases "parenteral administration" and "administered parenterally" as used herein means modes of administration other than enteral and topical administration, usually by injection, and includes, without limitation, intravenous, intraocular (such as intravitreal), intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically-acceptable carrier.

Methods of introduction may also be provided by rechargeable or biodegradable devices. Various slow release polymeric devices have been developed and tested in vivo in recent years for the controlled delivery of drugs, including proteinaceous biopharmaceuticals. A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the patient's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art. See, e.g., Isselbacher et al. (1996).[28]

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In other embodiments, the active compound will be administered once daily.

The patient receiving this treatment is any animal in need, including primates, in particular humans; and other mammals such as equines bovine, porcine, sheep, feline, and canine; poultry; and pets in general.

In certain embodiments, compounds of the invention may be used alone or conjointly administered with another type of therapeutic agent.

The present disclosure includes the use of pharmaceutically acceptable salts of compounds of the invention in the compositions and methods of the present invention. In certain embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benenthamine, benzathine, betaine, calcium hydroxide, choline, deanol, diethanolamine, diethylamine, 2-(diethylamino)ethanol, ethanolamine, ethylenediamine, N-methylglucamine, hydrabamine, 1H-imidazole, lithium, L-lysine, magnesium, 4-(2-hydroxyethyl)morpholine, piperazine, potassium, 1-(2-hydroxyethyl)pyrrolidine, sodium, triethanolamine, tromethamine, and zinc salts. In certain embodiments, contemplated salts of the invention include, but are not limited to, Na, Ca, K, Mg, Zn or other metal salts.

In certain embodiments, contemplated salts of the invention include, but are not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, l-ascorbic acid, l-aspartic acid, benzenesulfonic acid, benzoic acid, (+)-camphoric acid, (+)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, d-glucoheptonic acid, d-gluconic acid, d-glucuronic acid, glutamic acid, glutaric acid, glycerophosphoric acid, glycolic acid, hippuric acid, hydrobromic acid, hydrochloric acid, isobutyric acid, lactic acid, lactobionic acid, lauric acid, maleic acid, l-malic acid, malonic acid, mandelic acid, methanesulfonic acid , naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, l-pyroglutamic acid, salicylic acid, sebacic acid, stearic acid, succinic acid, sulfuric acid, l-tartaric acid, thiocyanic acid, p-toluenesulfonic acid, trifluoroacetic acid, and undecylenic acid salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

Since prodrugs are known to enhance numerous desirable qualities of pharmaceuticals (e.g., solubility, bioavailability, manufacturing, etc.), the compounds of the present invention may be delivered in prodrug form. Thus, the present invention is intended to cover prodrugs of the presently claimed compounds, methods of delivering the same and compositions containing the same. "Prodrugs" are intended to include any covalently bonded carriers which release an active parent drug of the present invention in vivo when such prodrug is administered to a mammalian subject. Prodrugs the present invention are prepared by modifying functional groups present in the compound in such a way that the modifications are cleaved, either in routine manipulation or in vivo, to the parent compound. Prodrugs include compounds of the present invention wherein a hydroxy, amino, or sulfhydryl group is bonded to any group that, when the prodrug of the present invention is administered to a mammalian subject, it cleaves to form a free hydroxyl, free amino, or free sulfhydryl group, respectively. Examples of prodrugs include, but are not limited to, acetate, formate and benzoate derivatives of alcohol and amine functional groups in the compounds of the present invention.

"Stable compound" and "stable structure" are meant to indicate a compound that is sufficiently robust to survive isolation to a useful degree of purity from a reaction mixture, and formulation into an efficacious therapeutic agent. The present invention is intended to embody stable compounds.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting. Although methods and materials similar or equivalent to those described herein can be used in the practice or testing of this disclosure, suitable methods and materials are described below.

EXAMPLES

The invention now being generally described, it will be more readily understood by reference to the following examples which are included merely for purposes of illustration of certain aspects and embodiments of the present invention and are not intended to limit the invention.

Example 1

SCREENING OF CHEMBRIDGE LIBRARY USING ANTI-PFGARP ANTIBODY

Our published inhibition of binding-based HTS screening approach[29] was adapted to screen a subset of the DIVERSet library. Briefly, PfGARP was coupled to Luminex beads and incubated with mixtures of small molecules from the library. The beads were washed and probed with biotinylated anti-PfGARP. The beads were washed again, and antibody binding was detected with streptavidin-PE. In this inhibition of binding assay, low fluorescence values indicated the presence of small molecule compounds in the mixture that specifically bind to PfGARP and inhibit the binding of anti-PfGARP.

Using this assay, we screened a 6,400 compound subset of the 160,000 compound DIVERSet library for inhibition of binding between bead-immobilized PfGARP and polyclonal anti-PfGARP antibodies. This subset was arrayed as 80 mixtures of 80 compounds (all with unrelated scaffolds) with each compound at 10 µM. Of the 80 mixtures tested, five mixtures inhibited binding of anti-PfGARP to PfGARP coated beads by more than 20% (shown in FIG. 1). This level of inhibition likely reflects the high affinity of the polyclonal anti-PfGARP and the fact that the polyclonal antibody recognizes multiple epitopes in PfGARP with only a minority of these epitopes being blocked by drug binding.

Figure 2:
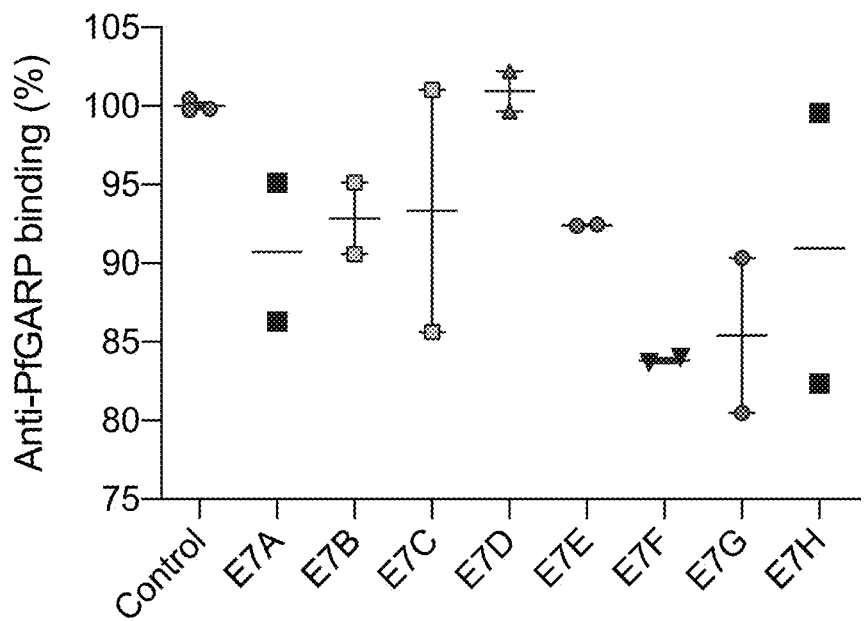
FIG. 2 is a graph demonstrating the inhibition of anti-PfGARP antibody binding to PfGARP by E7 compounds.
Figure 3:
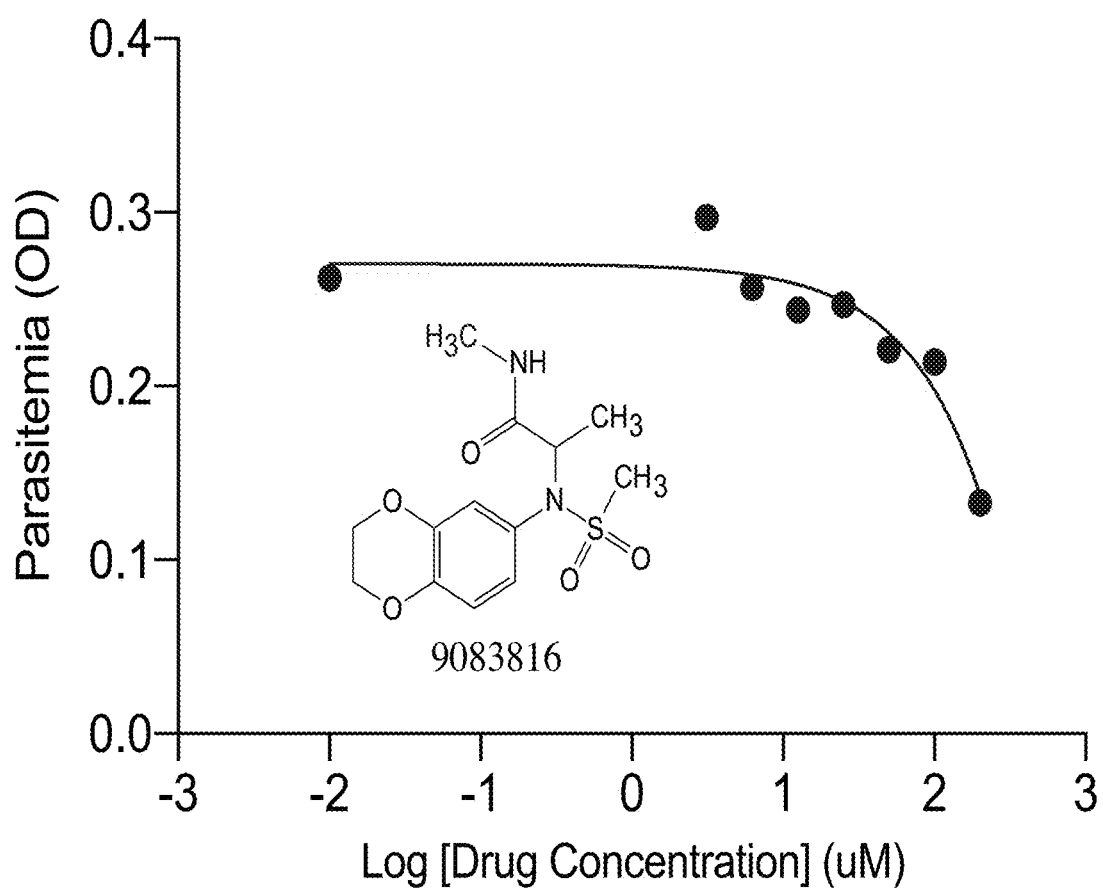
FIG. 3 is a line graph demonstrating that compound ID #9083816 killed P. falciparum parasites. P. falciparum strain 3D7 parasites were synchronized to the ring stage and incubated with a dilution series of compound or media control for 48 hours followed by quantification of parasitemia by Plasmodium lactate dehydrogenase assay (pLDH) assay.
Figure 4A:
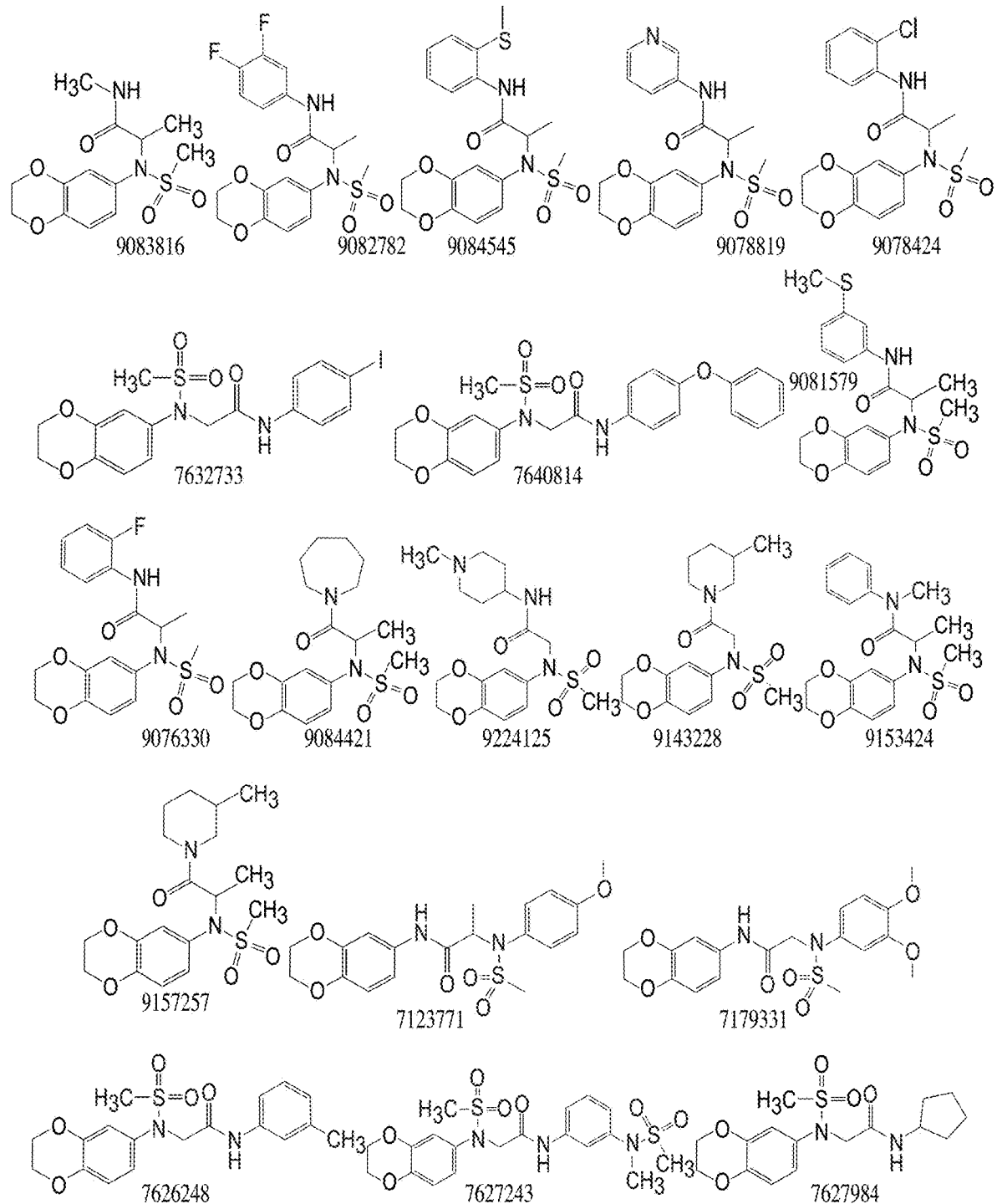
FIG. 4A provides the chemical structures of ID #s 9083816; 9082782; 9084545; 9078819; 9078424; 7632733; 7640814; 9081579; 9076330; 9084421; 9224125; 9143228; 9153424; 9157257; 7123771; 7179331; 7626248; 7627243; and 7627984.
Figure 4B:
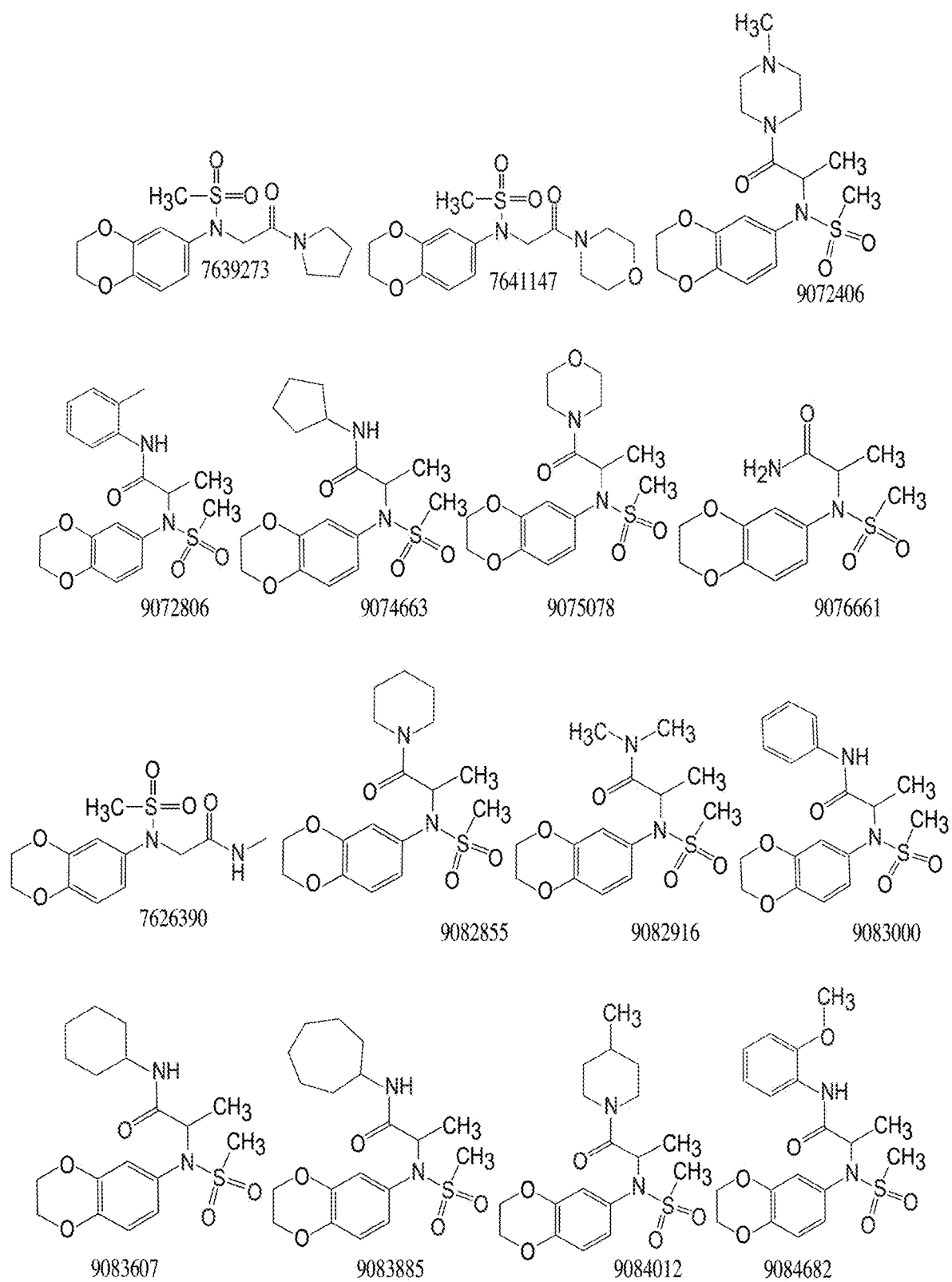
FIG. 4B provides the chemical structures of ID #s 7639273; 7641147; 9072406; 9072806; 9074663; 9075078; 9076661; 7626390; 9082855; 9082916; 9083000; 9083607; 9083885; 9084012; and 9084682.
Figure 4C:
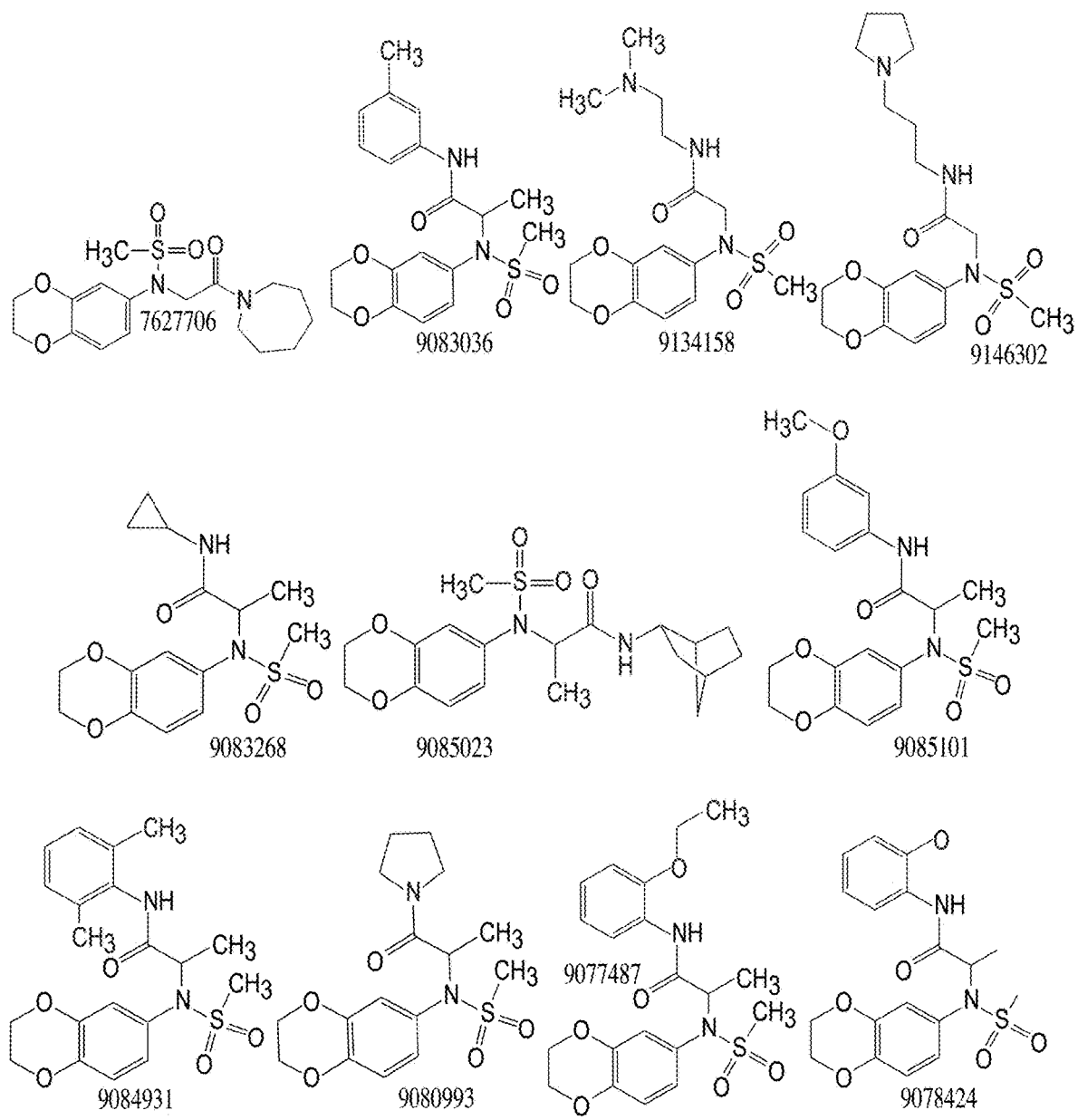
FIG. 4C provides the chemical structures of ID #s 7627706; 9083036; 9134158; 9146302; 9083268; 9085023; 9085101; 9084931; 9080993; 9077487; and 9078424.

We deconvoluted the most active mixture, E7, by testing its 80 compounds, arrayed as eight mixtures of 10 compounds each, in a similar antibody inhibition assay (FIG. 2). The most active mixture, E7F, was further deconvoluted in parasite killing assays which identified ID #9083816 as having anti-parasite activity (FIG. 3).

A limited structure-activity relationship (SAR) study was then conducted, evaluating 48 analog compounds having the same backbone (black in FIG. 3 inset and FIG. 4), but varying R groups (red) using *P. falciparum* strain 3D7 and 3D7 PfGARP KO parasites. For the SAR study, 3D7 or 3D7 PfGARP KO parasites were synchronized to the ring stage and incubated with a dilution series of compounds or media control for 48 hours followed by quantification of parasitemia by *Plasmodium* lactate dehydrogenase assay (pLDH) assay.[30] Each dilution was evaluated in quadruplicate. In all experiments, DMSO concentration was <0.1%.

FIG. 4 shows compounds that exhibited antimalarial activity. The R groups encompassed: large hydrophobic non-aromatics, secondary amides, secondary amides with aromatic or aliphatic substituents, and constrained hydrophobic secondary amides. The results of this screen indicate that large aromatic R groups enhance drug potency.

Example 2

Characterization of Antimalarial Small Molecule Candidate

The small molecule compounds shown in FIG. 4 were tested for their abilities to kill *P. falciparum* strain 3D7 parasites. The $IC_{50}$ of these compounds are provided in Table 1.

TABLE 1

| ID# | $IC_{50}$ (μM) | ID# | $IC_{50}$ (μM) | ID# | $IC_{50}$ (μM) |
|---|---|---|---|---|---|
| 9076330 | 22.03 | 7627243 | 80.44 | 9083607 | 160.3 |
| 9082782 | 29.92 | 7627706 | 143.1 | 9083885 | 57.16 |
| 9084545 | 101.3 | 7627984 | 876.5 | 9084012 | 80.21 |
| 9078819 | 6988 | 7639273 | >10,000 | 9084194 | 92.62 |

TABLE 1-continued

| ID# | IC$_{50}$ (µM) | ID# | IC$_{50}$ (µM) | ID# | IC$_{50}$ (µM) |
|---|---|---|---|---|---|
| 9078424 | 4.389 | 7641147 | 355 | 9084682 | >10,000 |
| 7632733 | 50.25 | 9072406 | 411.8 | 9084931 | 68.54 |
| 7640814 | 30.85 | 9072806 | 85.33 | 9085023 | 46.75 |
| 9081579 | 1.877 | 9074663 | 235.3 | 9085101 | >10,000 |
| 9083816 | 123 | 9075078 | >10,000 | 9086603 | 85.57 |
| 9084421 | 30.96 | 9076661 | 132.5 | 9089095 | 55.31 |
| 9091186 | 23.59 | 9077487 | 49.63 | 9093277 | 37.38 |
| 9095471 | 17.34 | 9080993 | >10,000 | 9096942 | 30.26 |
| 9153424 | 69.76 | 9082668 | 77.98 | 9098333 | 36.62 |
| 9157257 | 21.14 | 9082855 | 70.26 | 9134158 | 133.9 |
| 7123771 | >10,000 | 9082916 | 508.6 | 9143228 | 111.3 |
| 7179331 | >10,000 | 9083000 | 181.5 | 9146302 | 123.5 |
| 7626248 | 182.4 | 9083036 | 80.79 | 9224125 | 114.8 |
| 7626390 | >10,000 | 9083268 | 387.2 | 9078424 | 4.4 |

Figure 5A:
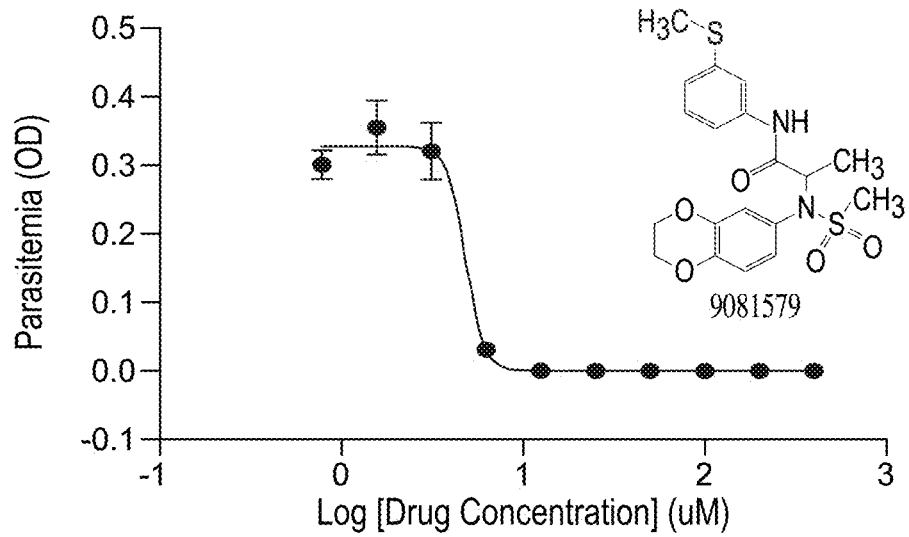
FIG. 5 demonstrates that compounds ID #9081579 (FIGS. 5A) and ID #9078424 (FIG. 5B) killed P. falciparum parasites. P. falciparum strain 3D7 (Panels A and C) or 3D7 PfGARP KO (Panel B) parasites were synchronized to the ring stage and incubated with a dilution series of compound or media control for 48 hours followed by quantification of parasitemia by pLDH assay.
Figure 5A:
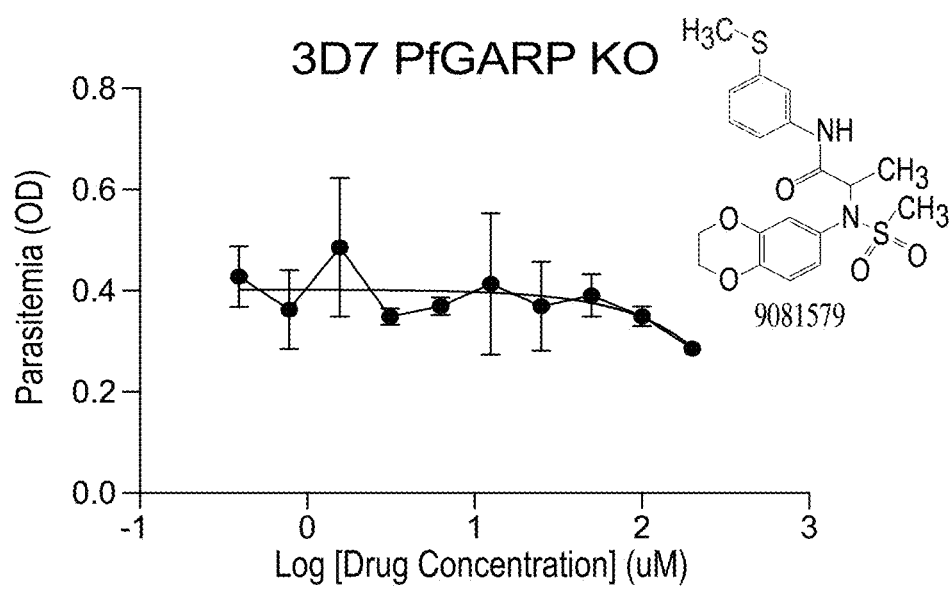
Figure 5B:
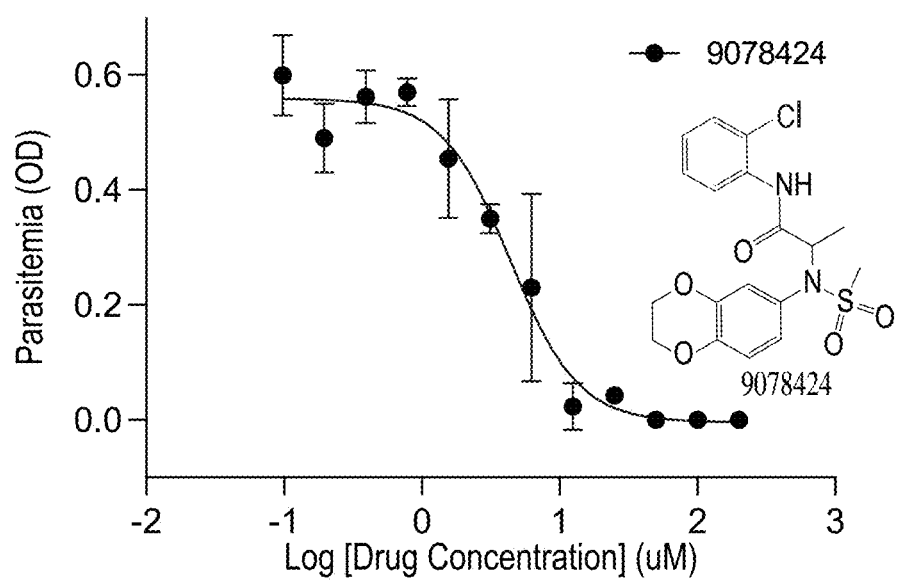

One compound (ID #9081579) was identified with enhanced parasite killing activity compared to the parent compound (ID #9083816) with an IC$_{50}$ of 1.8-4.8 µM in 3D7 parasites (FIG. 5A, Panel A) and no activity in PfGARP KO parasites (FIG. 5A, Panel B). Compound ID #9081579 was also evaluated in the highly chloroquine and quinine resistant strain INDO, and it had an IC$_{50}$ of 5-8 µM (data not shown). A second compound (ID #9078424) was identified with enhanced parasite killing activity compared to the parent compound (ID #9083816) with an IC$_{50}$ of 4.4 µM in 3D7 parasites (FIG. 5B, Panel C)

Figure 6:
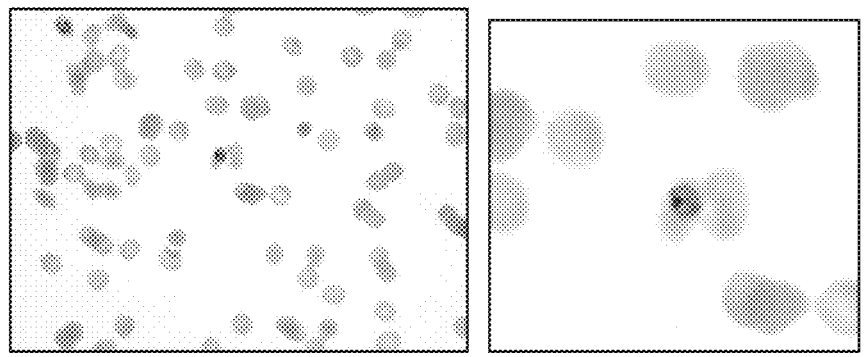
FIG. 6 illustrates the morphological changes that occur when compound ID #9081579 activates parasite apoptosis in P. falciparum strain 3D7 (Panel C), or 3D7 PfGARP KO (Panel B) incubated with 100 µM ID #9081579 (Panels A-B) or vehicle control (Panel A) for 48 hours.
Figure 6:
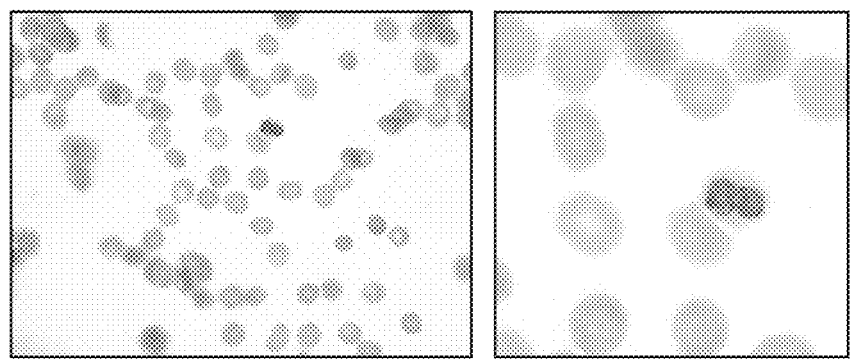
Figure 6:
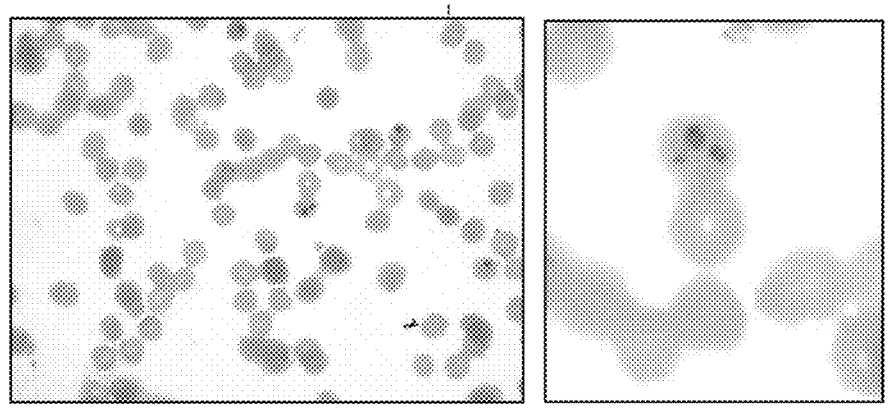
Figure 7A:
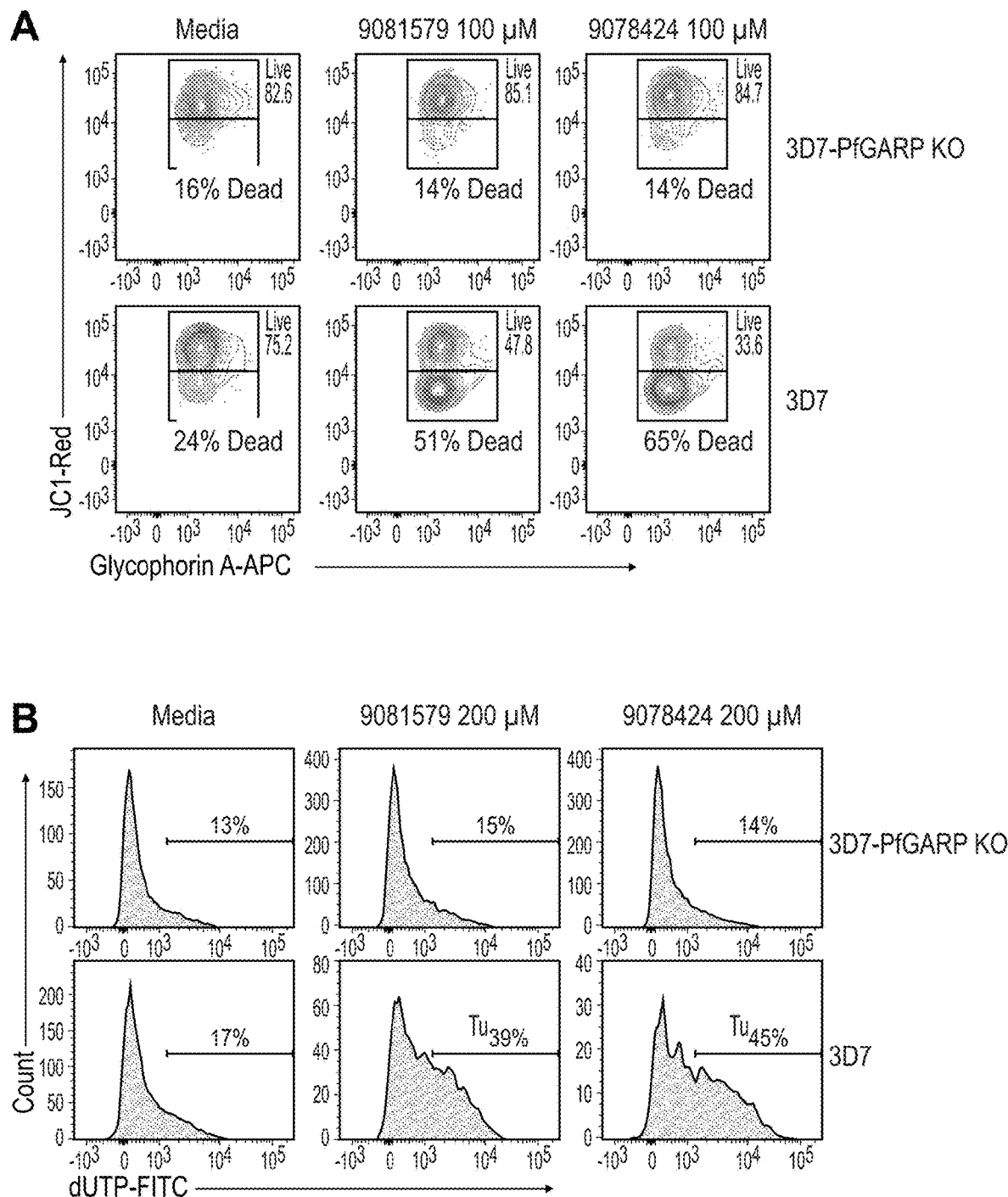
FIG. 7 demonstrates that compounds ID #9081579 and ID #9078424 activate parasite apoptosis as assessed by JC-1 staining (Panel A), DNA fragmentation as assessed by TUNEL staining (Panel B), and caspase-like enzyme activation as assessed by ApoStat (FITC-VAD-FMK) staining (Panel C).
Figure 7B:
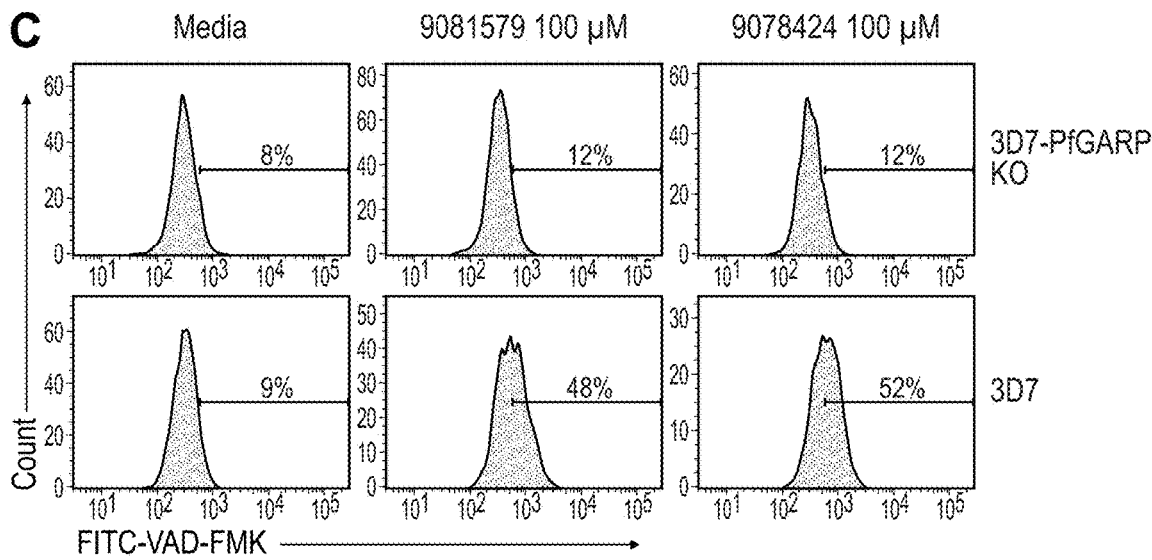

To assess the morphological effects of compound ID #9081579, 3D7 or 3D7 PfGARP KO parasites were synchronized to the ring stage and incubated with 100 µM 9081579 or vehicle control for 48 hours. As shown in FIG. 6, compound ID #9081579-treated 3D7 parasites displayed the characteristic dysmorphic, shrunken features with pyknotic nuclei seen in anti-PfGARP (FIG. 6, Panel C) but such morphological changes were not observed in ID #9081579-treated 3D7-PfGAPR KO parasites (FIG. 6, Panel B) or in vehicle-treated 3D7 parasites (FIG. 6, Panel A). These results demonstrate both the specificity of compound ID #9081579 activity for PfGARP, as well as its lack of general toxicity to eukaryotic cells (3D7-PfGARP-KO cells). This induction of apoptosis is further supported by caspase activation and mitochondrial depolarization assays induced by compounds ID #9081579 and ID #9078424 (see FIG. 7).

Figure 8:
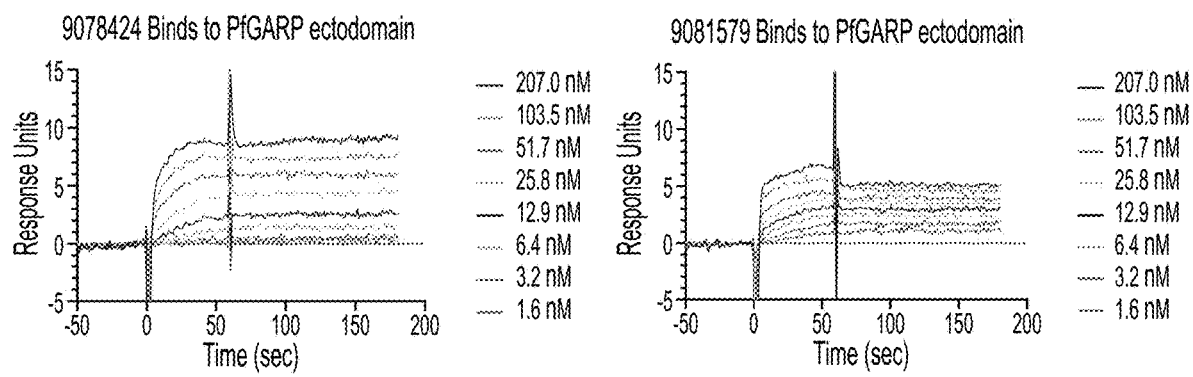
FIG. 8 is a line graph demonstrating that compounds ID #9078424 (left panel) and ID #9081579 (right panel) bind specifically to full length PfGARP-A, as demonstrated by surface plasmon resonance (SPR). Drugs were immobilized to a CM5 sensorchip and probed with varying concentrations of full length PfGARP on a BiaCore100. Results demonstrated fast on, slow off kinetics and a $K_D$=29.9 and 24.4 nM, respectively.

Direct binding of compounds ID #9081579 and ID #9078424 to its target PfGARP was demonstrated by surface plasmon resonance (SPR). PfGARP-A was immobilized to a sensorchip and probed with varying concentrations of drug on a BiaCore100. As shown in FIG. 8, results indicated fast on/off kinetics and a $K_D$=29.9±0.8 and 24.8±0.91 nM, respectively.

In summary, using our inhibition of anti-PfGARP binding assay, we have screened a subset (4%) of the Chem Bridge DIVERset 160,000 compound library and identified a novel class of antimalarial therapeutic small molecules which selectively kills *P. falciparum* parasites by activating parasite apoptosis. The SAR study identified two compounds (ID #9081579 and ID #9078424) which: (1) have drug-like chemical properties (LogP, MW, # of rotatable bonds), (2) bind specifically to PfGARP, (3) activate parasite apoptosis, and (4) kill parasites with an IC$_{50}$ of 1-5 µM and a selectivity index>100.

Example 3

TOXICITY ASSESSMENT OF ANTIMALARIAL SMALL MOLECULE CANDIDATE

As discussed above, the finding that 3D7 parasites treated with compound ID #9081579 displayed the characteristic dysmorphic, shrunken features with pyknotic nuclei seen in anti-PfGARP (FIG. 6, Panel C), but not in 3D7-PfGAPR KO parasites treated with compound ID #9081579 (FIG. 6, Panel B), demonstrated both the specificity of the activity of compound ID #9081579 for PfGARP, as well as their lack of general toxicity to eukaryotic cells (3D7-PfGARP-KO cells). Additional toxicity assessments were conducted in BeWo cells and human white blood cells (WBC).

Figure 9:
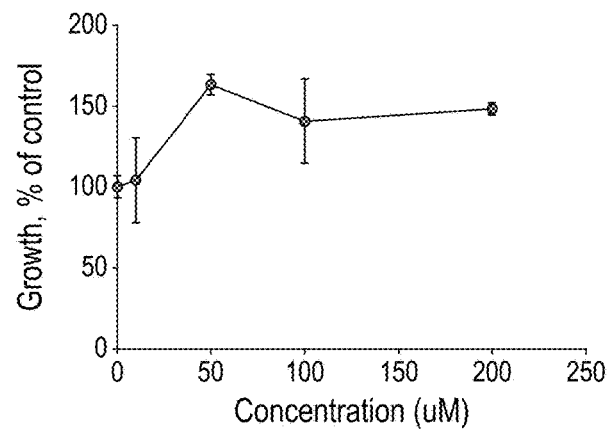
FIG. 9 depicts is a line graph demonstrating that compound ID #9081579 does not inhibit the growth of BeWo cells. BeWo, a human choriocarcinoma cell line, were grown in the presence of increasing concentrations of ID #9081579 or vehicle alone and cell concentration was measured using a crystal violet viability assay performed 48 hours after addition of drug. Points represent the mean of three independent technical replicates. Bars represent SD.

BeWo cells are a human placental cell line that originates from a choriocarcinoma.[31] These cells have been used widely as an in vitro model to study placental uptake of a variety of nutrients including glucose, amino acids, and iron. BeWo choriocarcinoma cells were grown in the presence of increasing concentrations of compound ID #9081579 or vehicle alone. Cell concentration was measured using a crystal violet viability assay performed 48 hours after addition of drug. As shown in FIG. 9, BeWo cells showed no loss of viability at up to 200 µM—the highest concentration tested—50 fold higher than the IC$_{50}$ for parasites.

Figure 10:
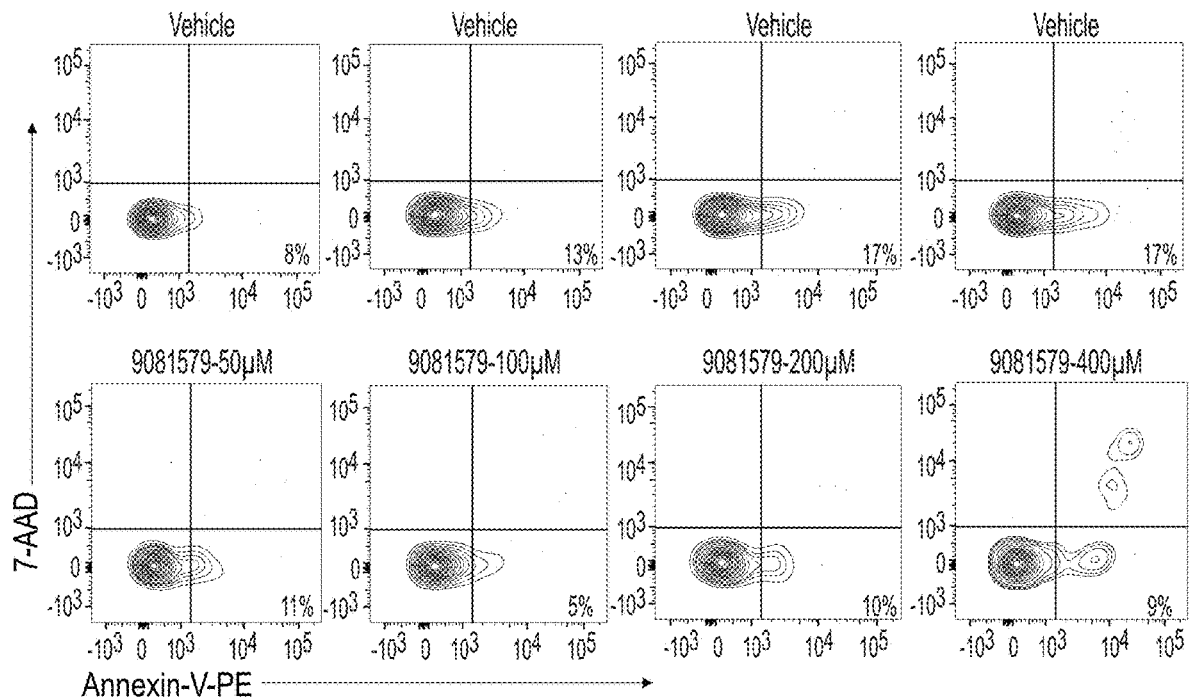
FIG. 10 demonstrates that compound ID #9081579 is not cytotoxic to human white blood cells. Compound ID #9081579 is not toxic and does not inhibit the growth of human WBC (CD45+) when incubated in the presence of increasing concentrations of compound ID #9081579 or vehicle alone for 48 hours. Cells were stained with 7AAD and annexin V and analyzed by flow cytometry to assess viability (7AAD−, annexin V−), necrosis (7AAD+, annexin V−), early apoptosis (7AAD−, annexin V+), and late apoptosis (7AAD+, annexin V+).

Human WBC (CD45+) were incubated in the presence of increasing concentrations of compound ID #9081579 or vehicle alone for 48 hours. Cells were stained with 7AAD and annexin V and analyzed by flow cytometry to assess viability (7AAD−, annexin V−), necrosis (7AAD+, annexin V−), early apoptosis (7AAD−, annexin V+), and late apoptosis (7AAD+, annexin V+). As shown in FIG. 10, Human WBC (CD45+) showed no loss of viability at up to 400 µM—the highest concentration tested—100 fold higher than the IC$_{50}$ for parasites.

In summary, compound ID #9081579 does not appear to be toxic to parasite and non-parasite cells that do not express PfGARP.

Example 4

2D HSQC CHARACTERIZATION OF ID #9078424 BINDING SIGNATURE TO PfGARP

Two-dimension (2D) heteronuclear single quantum coherence (HSQC) spectroscopy was used to characterize the binding of ID #9078424 to PfGARP.

Figure 11:
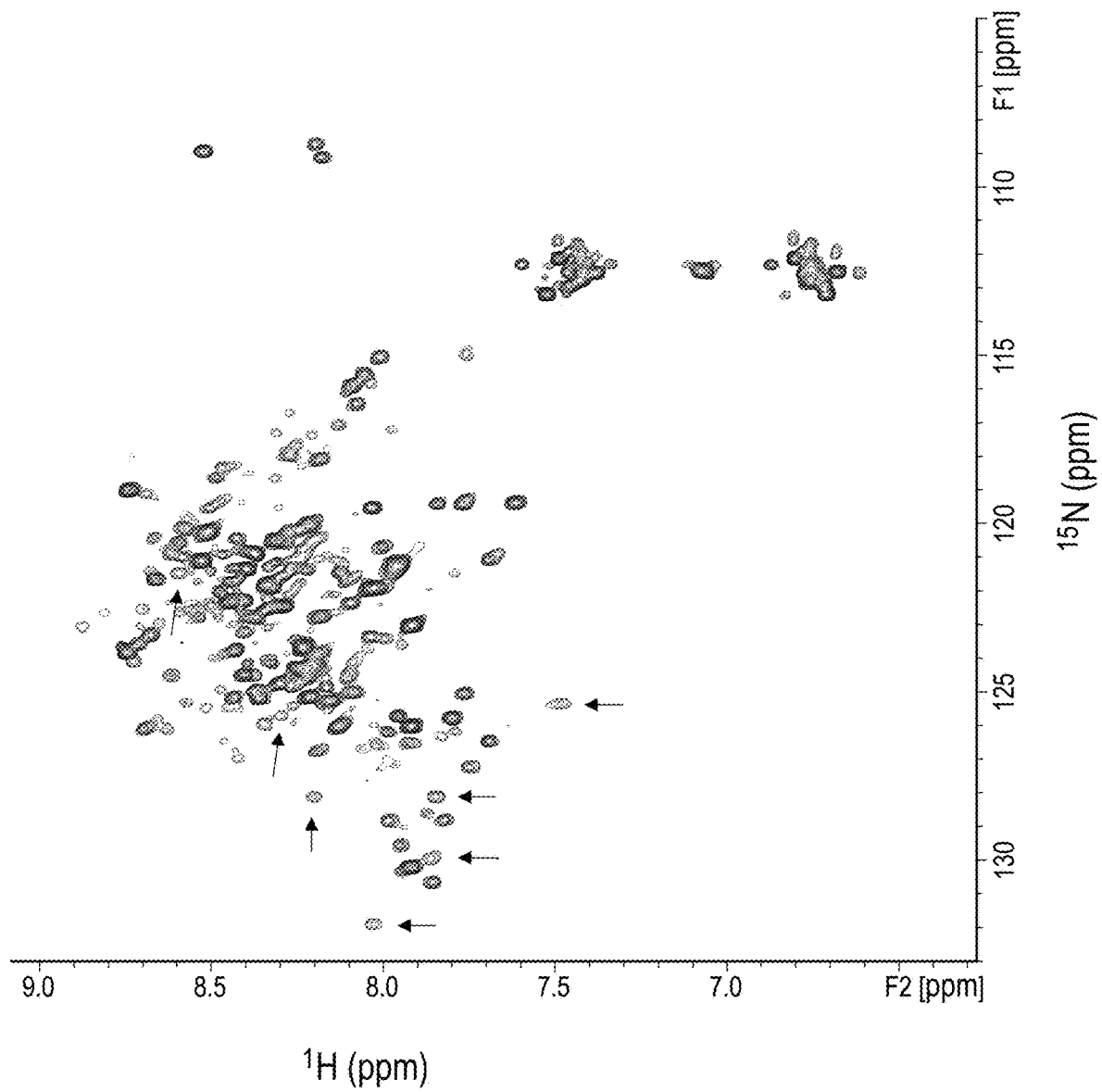
FIG. 11 demonstrates the binding signature for ID #9078424 to PfGARP identified by $^1H$-$^{15}N$ HSQC. Spectra were collected on a 600 MHz Bruker spectrometer at 17° C. from samples with PfGARP (aa 377-560) alone (Red), or in complex with ID #9078424 (Blue). Arrows indicate spectral shifts in the PfGARP spectrum which indicate specific drug binding.

Using a series of recombinant PfGARP fragments, $^1H$-$^{15}N$ HSQC experiments were performed using PfGARP with and without ID #9078424. These experiments confirmed predictions that PfGARP was largely an intrinsically disordered protein. In addition, regions of structure were identified as well as specific drug binding to a PfGARP fragment encoding aa 377-560, confirming the SPR data (FIG. 11).

Example 5

SINGLE DOSE PK CHARACTERIZATION

Figure 12:
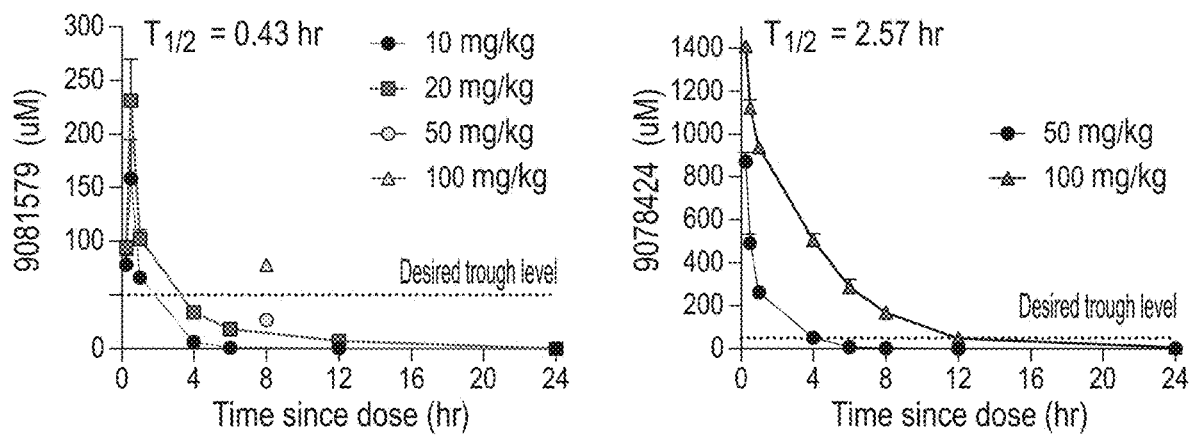
FIG. 12 depicts a single dose PK of ID #9081579 (left panel) and ID #9078424 (right panel) in mice. Balb/cJ mice (n=2 per timepoint) were treated intraperitoneally (IP) with a single dose of drug and blood samples were collected at the indicated timepoints for analysis of drug levels by LC/MS-MS. Error bars indicate SEM. Desired trough level of 50 µM is indicated by dashed line.

A single dose pharmacokinetic (PK) study was conducted on compounds ID #9081579 or ID #9078424. Both compounds were delivered IP. Each maintained plasma trough levels in mice above 50 µM (a level that is uniformly lethal to parasites in culture) using a 100 mg/kg dose with 8-hour dose interval for both drugs (FIG. 12).

Importantly, this dose was well tolerated by all treated mice with no signs of toxicity.

Example 6

ID #9081579 AND ID #9078424 KILL P. FALCIPARUM IN VIVO

The NSG mouse (NOD scid gamma mouse) is a brand of immunodeficient laboratory mice, which carries the strain non-obese diabetic (NOD). The efficacy of both lead compounds ID #9081579 and ID #9078424 were evaluated in the NSG/P. falciparum humanized mouse model.[32,33,34,35]

Figure 13:
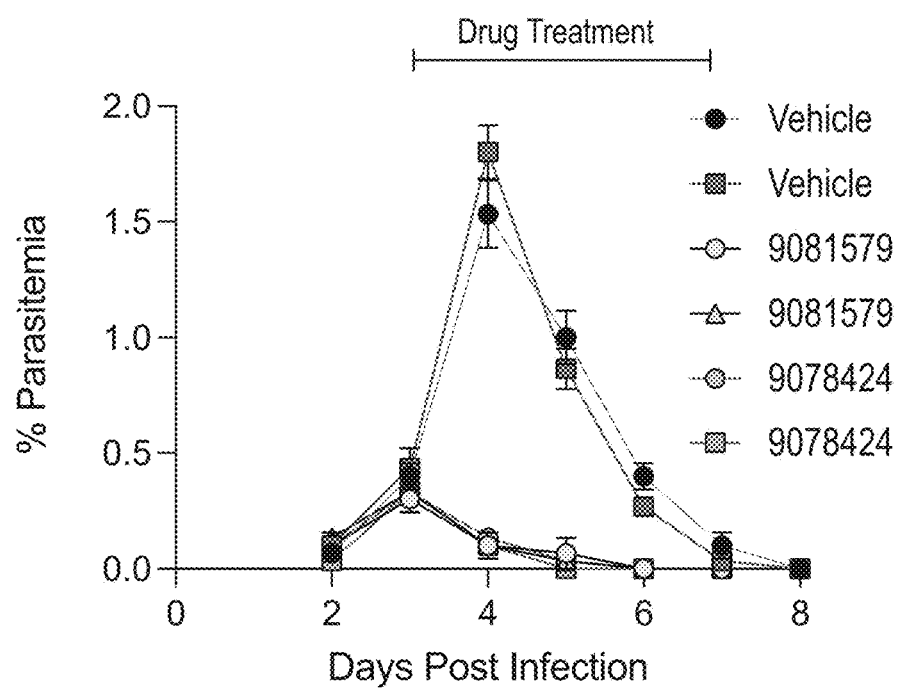
FIG. 13 demonstrates that ID #9081579 and ID #9078424 killed P. falciparum in vivo. Drugs were evaluated in the NSG/P. falciparum humanized mouse model. Mice were reconstituted with human RBC, infected with P. falciparum 3D7 strain parasites and treated with drug or vehicle control (100 mg/kg dosed IP every 8 hours for 4 days). Parasitemia was monitored by microscopy. Results representative of two independent experiments.

Briefly, NSG mice (NOD.Cg-Prkdc$^{scid}$Il2rg$^{tm1Wjl}$/SzJ; JAX Cat #005557) were reconstituted with human RBC (huRBC) by daily IP injections with 1 mL of huRBC at 50% hematocrit. On day 12, mice were infected with of 2×10$^7$ Pf3D7 infected huRBCs via tail vein injection. On day 15, mice were injected IP with ID #9081579 or ID #9078424 at 100 mg/kg final dose (approximately 2 mg per mouse in 5% DMSO/95% PEG400 vehicle) or vehicle alone. Mice were treated with drug or vehicle control every 8 hours for 4 days. This dose and schedule was designed to maintain plasma drug levels above 50 µM, as informed by our single dose PK study in Example 5. Both drugs showed rapid clearance of parasites with no detectible parasitemia after three days of drug treatment (FIG. 13). This rapid clearance is similar to that observed for artesunate at 50 and 100 mg/kg in this model.[36] This experiment was independently repeated with consistent results.

Figure 14:
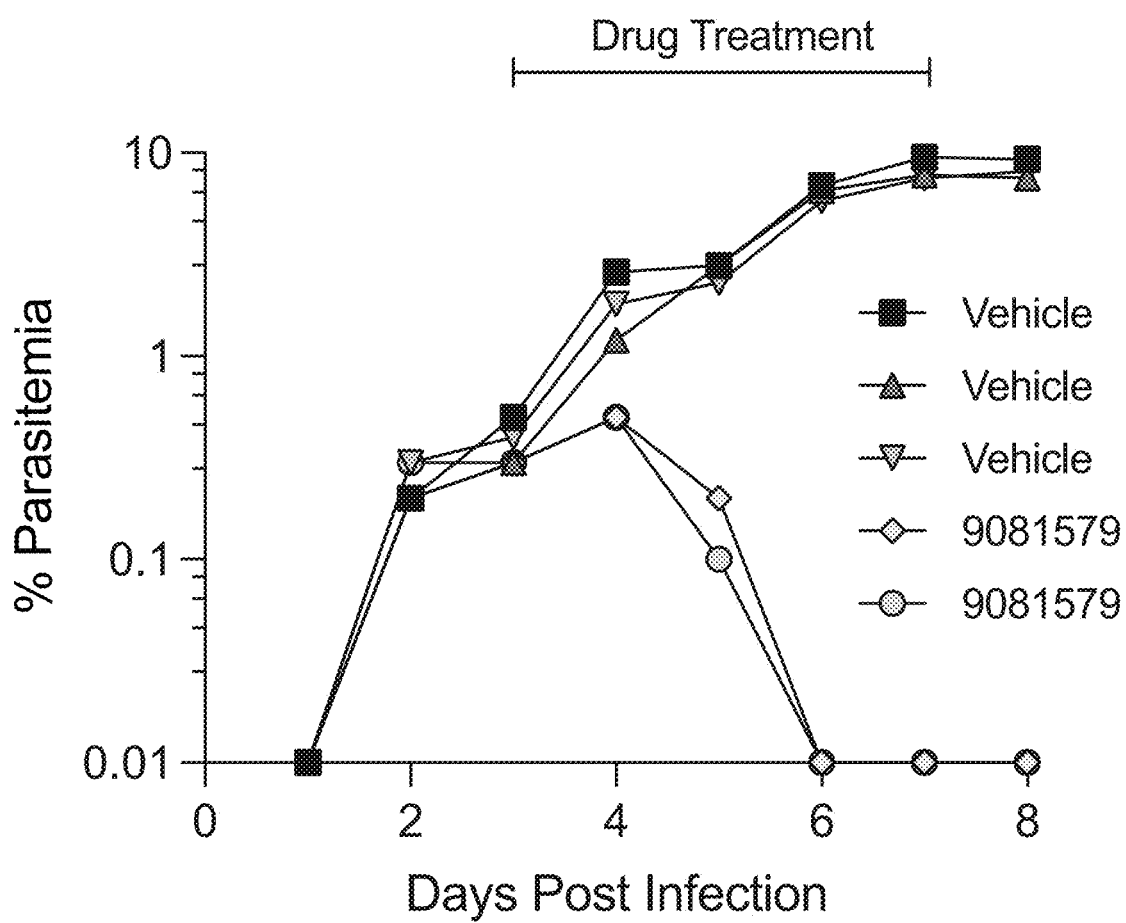
FIG. 14 demonstrates that ID #9081579 kills P. falciparum in vivo. ID #9081579 was evaluated in the NSG/P. falciparum humanized mouse model. Mice were reconstituted with human RBC, infected with P. falciparum $3D7^{0087/N9}$ strain parasites and treated with drug or vehicle control (100 mg/kg dosed IP every 8 hours for 4 days). Parasitemia was monitored by microscopy.

We then challenged 3D7 parasites that had not been adapted to the NSG model,[37,38] and thus did not support the higher parasitemia seen with adapted parasites. Just prior to submission, we have repeated this experiment using ID #9081579 and an adapted parasite strain (3D70087/N9). Again, the PfGARP-targeting small molecule, ID #9081579, rapidly eliminated parasitemia (FIG. 14).

CONCLUSION

The above-described data demonstrate that the compositions of the present invention have anti-malarial efficacy in vivo.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize or be able to ascertain using no more than routine experimentation, many equivalents to the specific embodiments described herein. Such equivalents are intended to be encompassed by the following claims.

REFERENCES

[1] WHO. The World Malaria Report. Switzerland: WHO, 2016.
[2] Arnold, K., et al. (1990). "*A Randomised Comparative Study of Artemisinin (Qinghaosu) Suppositories and Oral Quinine in Acute Falciparum Malaria.*" Trans Roy Soc Trop Med Hyg. 84: 499-502.
[3] Cao, X.T., et al. (1997). "*Comparison of Artemisinin Suppositories, Intramuscular Artesunate and Intravenous Quinine for the Treatment of Severe Childhood Malaria.*" Trans Roy Soc Trop Med Hyg. 91: 335-342.
[4] Vinh, H., et al. (1997). "*Severe and Complicated Malaria Treated with Artemisinin, Artesunate or Artemether in Viet Nam.*" Trans Roy Soc Trop Med Hyg. 91: 465-467.
[5] Li, Q. and Weina, P. (2010). "*Artesunate: The Best Drug in the Treatment of Severe and Complicated Malaria.*" Pharmaceuticals (Basel), 3(7): 2322-2332.
[6] Kokwaro, G. (2009). "*Ongoing Challenges in the Management of Malaria.*" Malar. J. 8(Suppl 1): S2.
[7] Woodrow, C.J. & White, N.J. (2017). "The Clinical Impact of Artemisinin Resistance in Southeast Asia and the Potential for Future Spread." FEMS Microbiol. Rev. 41: 34-48.
[8] Raj, D.K., et al. (2020). "*Anti-PfGARP Activates Programmed Cell Death of Parasites and Reduces Severe Malaria.*" Nature 582: 104-108.
[9] U.S. Pat. No. 10,213,502, Kurtis, J., et al., "*Vaccine for Falciparum Malaria.*" Issued February 26, 2019.
[10] Raj, D.K., et al. (2020). "*Anti-PfGARP Activates Programmed Cell Death of Parasites and Reduces Severe Malaria.*" Nature 582: 104-108.
[11] Young, S.D., et al., (1995). "*L-743, 726 (DMP-266): A Novel, Highly Potent Nonnucleoside Inhibitor of the Human Immunodeficiency Virus Type 1 Reverse Transcriptase.*" Antimicrobial Agents and Chemotherapy, 39(12): 2602-2605.
[12] THE MERCK MANUAL OF DIAGNOSIS AND THERAPY, (2011). 19$^{th}$ Edition, published by Merck Sharp & Dohme Corp., (ISBN 978-0-911910-19-3).
[13] THE ENCYCLOPEDIA OF MOLECULAR CELL BIOLOGY AND MOLECULAR MEDICINE, Robert S. Porter et al. (eds.), published by Blackwell Science Ltd., 1999-2012 (ISBN 9783527600908).
[14] MOLECULAR BIOLOGY AND BIOTECHNOLOGY: A COMPREHENSIVE DESK REFERENCE, (1995). Robert A. Meyers (ed.), published by VCH Publishers, Inc. (ISBN 1-56081-569-8).
[15] IMMUNOLOGY, (2006). Werner Luttmann, published by Elsevier.
[16] JANEWAY'S IMMUNOBIOLOGY, (2014). Kenneth Murphy, Allan Mowat, Casey Weaver (eds.), Taylor & Francis Limited, (ISBN 0815345305, 9780815345305).
[17] LEWIN'S GENES XI, (2014). published by Jones & Bartlett Publishers (ISBN-1449659055).

[18] Michael Richard Green and Joseph Sambrook, (2012). MOLECULAR CLONING: A LABORATORY MANUAL, 4th ed., Cold Spring Harbor Laboratory Press, Cold Spring Harbor, N.Y., USA (ISBN 1936113414).

[19] Davis et al., (2012). BASIC METHODS IN MOLECULAR BIOLOGY, Elsevier Science Publishing, Inc., New York, USA (ISBN 044460149X).

[20] LABORATORY METHODS IN ENZYMOLOGY: DNA, (2013). Jon Lorsch (ed.) Elsevier (ISBN 0124199542).

[21] CURRENT PROTOCOLS IN MOLECULAR BIOLOGY (CPMB), (2014). Frederick M. Ausubel (ed.), John Wiley and Sons (ISBN 047150338X, 9780471503385).

[22] CURRENT PROTOCOLS IN PROTEIN SCIENCE (CPPS), (2005). John E. Coligan (ed.), John Wiley and Sons, Inc.

[23] CURRENT PROTOCOLS IN IMMUNOLOGY (CPI) (2003). John E. Coligan, ADAM Kruisbeek, David H Margulies, Ethan M Shevach, Warren Strobe, (eds.) John Wiley and Sons, Inc. (ISBN 0471142735, 9780471142737).

[24] Raj, D.K., et al. (2020). "*Anti-PfGARP Activates Programmed Cell Death of Parasites and Reduces Severe Malaria.*" Nature 582: 104-108.

[25] U.S. Pat. No. 10,213,502, Kurtis, J., et al., "*Vaccine for Falciparum Malaria.*" Issued February 26, 2019.

[26] Vandana, D., et al. (2019). "*Metacaspases: Potential Drug Target Against Protozoan Parasites.*" Front. Pharmacol. 10: 790.

[27] Meslin, B., (2011)."*Plasmodium Falciparum Metacaspase PfMCA-1 Triggers a z-VAD-fmk Inhibitable Protease to Promote Cell Death.*" PLoS One 6: e23867.

[28] Isselbacher, et al. (1996). HARRISON'S PRINCIPLES OF INTERNAL MEDICINE, 13 ed., 1814-1882.

[29] Gullingsrud, J., et al. (2015). "*High-Throughput Screening Platform Identifies Small Molecules That Prevent Sequestration of Plasmodium Falciparum-Infected Erythrocytes.*" J. Infect. Dis. 211: 1134-1143.

[30] Malik, S., et al. (2004). "*Plasmodium Lactate Dehydrogenase Assay to Detect Malarial Parasites.*" Med. J. India 17(5): 237-239.

[31] Pattillo, R.A. and Gey, G.O. (1968). "*The Establishment of a Cell Line of Human Hormone-Synthesizing Trophoblastic Cells In Vitro.*" Cancer Res 28: 1231-1236.

[32] Favuzza, P., et al. (2020). "*Dual plasmepsin-targeting antimalarial agents disrupt multiple stages of the malaria parasite life cycle.*" Cell Host & Microbe, 27: 642-658.

[33] Angulo-Barturen, I., et al. (2008). "*A murine model of falciparum-malaria by in vivo selection of competent strains in non-myelodepleted mice engrafted with human erythrocytes.*" PloS one, 3: e2252.

[34] Jimenez-Diaz, M.B., et al. (2009). "*Improved murine model of malaria using plasmodium falciparum competent strains and non-myelodepleted nod-scid il2rgammanull mice engrafted with human erythrocytes.*" Antimicrob. Agents Chemother. 53: 4533-4536.

[35] Phillips, M.A., et al. (2015). "*A long-duration dihydroorotate dehydrogenase inhibitor (dsm265) for prevention and treatment of malaria.*" Science Translational Medicine; 7: 296ra111.

[36] See FIG. 3 in Jimenez-Diaz, M.B., et al. (2009). "*Improved murine model of malaria using plasmodium falciparum competent strains and non-myelodepleted nod-scid il2rgammanull mice engrafted with human erythrocytes.*" Antimicrob. Agents Chemother. 53: 4533-4536.

[37] Angulo-Barturen, I., et al. (2008). "*A murine model of falciparum-malaria by in vivo selection of competent strains in non-myelodepleted mice engrafted with human erythrocytes.*" PloS one, 3: e2252.

[38] Jimenez-Diaz, M.B., et al. (2009). "*Improved murine model of malaria using plasmodium falciparum competent strains and non-myelodepleted nod-scid il2rgammanull mice engrafted with human erythrocytes.*" Antimicrob. Agents Chemother. 53: 4533-4536.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method of treating *P. falciparum* malaria comprising administering to a subject in need thereof a therapeutically-effective amount of a small molecule therapeutic agent that specifically binds to *P. falciparum*glutamic-acid-rich proteins (PfGARP) located on the exofacial surface of red blood cells (RBCs) infected with *P. falciparum*, wherein the small molecule therapeutic agent is:

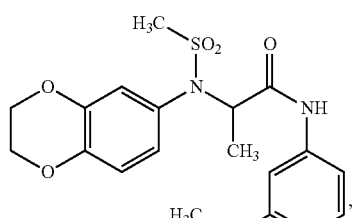
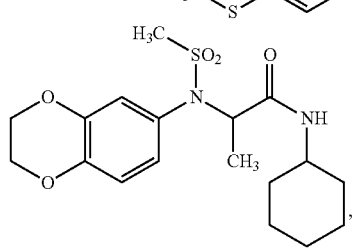
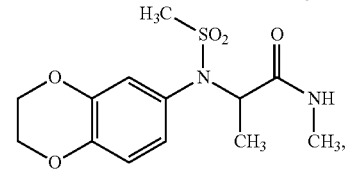
9072806
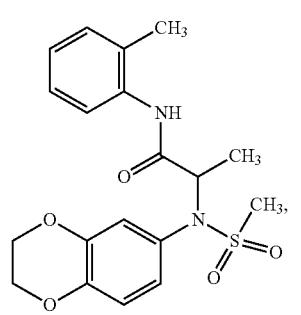
9076661
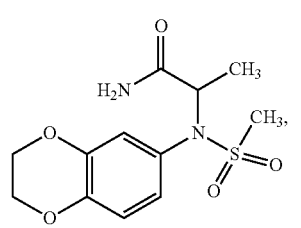
9084862
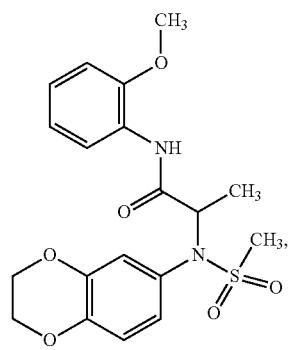
-continued
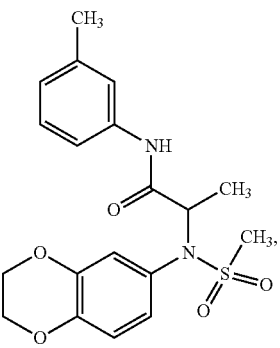
9083036
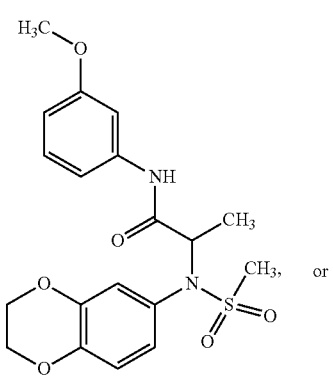
9085101
or
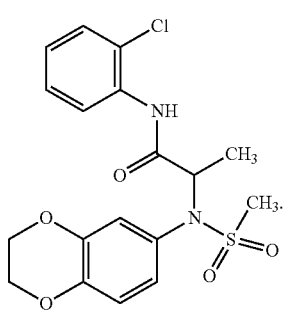
9078424
2. The method of claim 1, wherein the small molecule therapeutic agent is in a pharmaceutical formulation.
3. The method of claim 1, wherein the method does not activate an apoptosis in subject host cells or parasite cells that do not express the PfGARP.
* * * * *

SEQUENCE LISTING

<160> NUMBER OF SEQ ID NOS: 1

<210> SEQ ID NO 1
<211> LENGTH: 17
<212> TYPE: PRT
<213> ORGANISM: Homo sapiens

<400> SEQUENCE: 1

Val Lys Asn Val Ile Glu Asp Glu Asp Lys Asp Gly Val Glu Ile Ile
1               5                   10                  15

Asn